US011986934B2

(12) United States Patent
Thompson et al.

(10) Patent No.: US 11,986,934 B2
(45) Date of Patent: May 21, 2024

(54) ADJUSTABLE PLIERS

(71) Applicant: Snap-on Incorporated, Kenosha, WI (US)

(72) Inventors: Christopher D. Thompson, Franklin, WI (US); Daniel M. Eggert, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 241 days.

(21) Appl. No.: 17/516,680

(22) Filed: Nov. 1, 2021

(65) Prior Publication Data

US 2023/0134778 A1 May 4, 2023

(51) Int. Cl.
*B25B 27/20* (2006.01)

(52) U.S. Cl.
CPC .................................. *B25B 27/205* (2013.01)

(58) Field of Classification Search
CPC ....... B25B 27/00; B25B 27/14; B25B 27/146; B25B 27/20; B25B 27/205; B25B 7/00; B25B 7/10
See application file for complete search history.

(56) References Cited

U.S. PATENT DOCUMENTS

| | | | |
|---|---|---|---|
| 2,483,380 | A | 9/1949 | Duffy |
| 3,208,318 | A | 9/1965 | Roberts |
| 3,662,449 | A | 5/1972 | Seiichi |
| 3,681,840 | A | 8/1972 | Pool |
| 3,762,019 | A | 10/1973 | Epstein |
| 4,296,655 | A | 10/1981 | Tesoro |
| 4,581,960 | A | 4/1986 | Putsch et al. |
| 4,773,288 | A | 9/1988 | Jang et al. |
| 4,793,224 | A | 12/1988 | Huang |
| 4,893,530 | A | 1/1990 | Warheit |
| 4,947,553 | A | 8/1990 | Bendickson et al. |

(Continued)

FOREIGN PATENT DOCUMENTS

| | | | |
|---|---|---|---|
| AU | 2013211520 | B2 | 2/2014 |
| CN | 2066796 | U | 12/1990 |

(Continued)

OTHER PUBLICATIONS

Irwin VISE-GRIP Convertible Snap Pliers, https://www.amazon.com/VISE-GRIP-Convertible-Pliers-2-Inch-2078900/dp/B000JNRROY/ref=sr_1_11?dchild=1&keywords=split+ring+pliers&qid=1627250171&sr=8-11(2021).

(Continued)

*Primary Examiner* — Robert J Scruggs
(74) *Attorney, Agent, or Firm* — McDonnell Boehnen Hulbert & Berghoff LLP

(57) ABSTRACT

Adjustable pliers includes a first plier half, a second plier half coupled to the first plier half, and a stud disposed in a slot of the second plier half. The first plier half includes a first handle and a first working tip opposite the first handle. The second plier half includes a second handle and second working tip opposite the second handle. The slot extends along a path from a first end of the path to a second end of the path, the path extends in a first direction at the first end of the path and extending in a second direction substantially parallel to the first direction at the second end of the path. A performance parameter is defined, at least in part, by a relationship between dimensions of the slot or of the second working tip.

18 Claims, 16 Drawing Sheets

(56) References Cited

U.S. PATENT DOCUMENTS

| | | | |
|---|---|---|---|
| 5,007,313 | A | 4/1991 | Jeromson, Jr. et al. |
| 5,065,650 | A | 11/1991 | Anderson et al. |
| 5,174,177 | A | 12/1992 | Jeromson, Jr. et al. |
| 5,419,221 | A | 5/1995 | Cole |
| 5,419,229 | A | 5/1995 | Van Doren |
| 5,515,587 | A | 5/1996 | Pool |
| 5,664,274 | A | 9/1997 | Collins |
| 5,694,818 | A | 12/1997 | Nickipuck |
| 5,865,075 | A | 2/1999 | Medved |
| 6,145,417 | A | 11/2000 | Bates et al. |
| 6,161,982 | A | 12/2000 | Cole |
| 6,257,105 | B1 | 7/2001 | Lin |
| 6,378,403 | B1 | 4/2002 | Bates et al. |
| 6,470,774 | B2 | 10/2002 | Chang |
| 6,678,930 | B1 | 1/2004 | Owoc |
| 6,792,837 | B2 | 9/2004 | Battistone |
| 6,983,677 | B1 | 1/2006 | Engel |
| 7,182,004 | B1 | 2/2007 | Wang |
| 7,194,936 | B2 | 3/2007 | Engel et al. |
| 7,222,558 | B2 | 5/2007 | Schmitt et al. |
| 7,730,810 | B1 | 6/2010 | Janson |
| D775,503 | S | 1/2017 | Ludtke et al. |
| D775,916 | S | 1/2017 | Ludtke et al. |
| 10,421,178 | B2 | 9/2019 | Engel et al. |
| 10,660,661 | B2 | 5/2020 | Beyer |
| 10,994,390 | B2 | 5/2021 | Dahlke et al. |
| 2004/0194590 | A1 | 10/2004 | Engvall et al. |
| 2008/0264216 | A1 | 10/2008 | Duffy |
| 2010/0018364 | A1 | 1/2010 | Chervenak et al. |
| 2011/0214538 | A1 | 9/2011 | Huang |
| 2013/0019720 | A1* | 1/2013 | Harrison ............... B25B 27/205 81/409 |
| 2016/0303721 | A1* | 10/2016 | Ludtke ...................... B25B 7/10 |
| 2018/0147706 | A1 | 5/2018 | Murg et al. |
| 2019/0232479 | A1 | 8/2019 | Wiwatowski et al. |

FOREIGN PATENT DOCUMENTS

| | | | |
|---|---|---|---|
| DE | 2364509 | A1 | 6/1975 |
| DE | 202013104228 | U1 | 10/2013 |
| FR | 1267166 | A | 7/1961 |
| GB | 1334877 | A | 10/1973 |
| TW | M385448 | Y | 8/2010 |
| WO | WO2001076826 | | 10/2001 |
| WO | WO2010/096093 | | 8/2010 |

OTHER PUBLICATIONS

9-PC. Push-Button Retaining Ring Pliers Set—PK9RRPB—Mac Tools, https://www.mactools.com/products/pk9rrpb?variant=39814992953527 (2021).

AMPRO T19170 Arched Handle 8-Inch Push Button Slip Joint Pliers—Amazon.com, https://www.amazon.com/T19170-Arched-Handle-8-Inch-Button/dp/B00A32EAGA (2021).

Bahco 8225 Adjustable Joint Pliers, 12-Inch—Slip Joint Pliers—Amazon.com, https://www.amazon.com/Bahco-8225-Adjustable-Pliers-12-Inch/dp/B0012KFHE6 (2021).

Swedish Pipe Wrench with Push Button Adjustment, https://www.superarbor.io/products/309087405-17-in-swedish-pipe-wrench-with-push-button-adjustment (2021).

Search Report prepared by the Great Britain Patent Office in Application No. GB2215293.8 dated Apr. 14, 2023.

* cited by examiner

ADJUSTABLE PLIERS

BACKGROUND

Pliers are a tool formed by two halves with handles at a proximal end and working tips at a distal end. Pliers can be used to grip various work pieces.

Overview

In a first embodiment, adjustable pliers are disclosed. The adjustable pliers include a first plier half and a second plier half coupled to the first plier half. The first plier half includes a first handle and a first working tip opposite the first handle. The second plier half includes a second handle, a second working tip opposite the second handle, and a slot extending along a path from a first end of the path to a second end of the path. The path extends in a first direction at the first end of the path and extends in a second direction substantially parallel to the first direction at the second end of the path. The first end of the path and the second end of the path are aligned with a first axis, and the second plier half extends from the second handle to the second working tip in a direction that is substantially aligned with a second axis that is perpendicular to the first axis. A performance parameter is defined, at least in part, by a relationship between dimensions of the slot or of the second working tip. The adjustable pliers also include a stud disposed in the slot, the stud being configured to be fixed with respect to the first plier half. When the stud is disposed at the first end of the slot and as the first and second handles are pushed toward each other, the first and second working tips are configured to move away from each other. When the stud is disposed at the second end of the slot and as the first and second handles are pushed toward each other, the first and second working tips are configured to move toward each other.

In an embodiment of the adjustable pliers, the path of the slot extends: (i) from the first end of the path to a lateral outermost position that is spaced from the first end of the path with respect to the first axis by a lateral offset, (ii) from the lateral outermost position to a most proximal position that is spaced from the first end of the path with respect to the second axis by a longitudinal offset, and (iii) from the most proximal position to the second end of the path, where the lateral outermost position is disposed on a first curved portion of the path, and where the most proximal position is disposed on a second curved portion of the path.

In an embodiment of the adjustable pliers, the performance parameter is defined, at least in part, by a first ratio of (i) the lateral offset and (ii) one half of a width of the first end of the slot.

In an embodiment of the adjustable pliers, the first ratio has a value in a range of 0.55 to 1.10.

In an embodiment of the adjustable pliers, the performance parameter is defined, at least in part, by a second ratio of (i) the longitudinal offset and (ii) a length of the second working tip along the second axis.

In an embodiment of the adjustable pliers, the second ratio has a value in a range of 1.03 to 2.28.

In an embodiment of the adjustable pliers, the performance parameter is defined, at least in part, by a third ratio of (i) an offset between the first end of the path and a center point of a radius of curvature of the second curved portion and (ii) a distance between the first end of the path and the second end of the path.

In an embodiment of the adjustable pliers, the third ratio has a value in a range of 0.26 to 0.35.

In an embodiment of the adjustable pliers, the performance parameter is defined by at least of two of: a first ratio of (i) the lateral offset and (ii) one half of a width of the first end of the slot, a second ratio of (i) the longitudinal offset and (ii) a length of the second working tip along the direction, and a third ratio of (i) an offset between the first end of the path and a center point of a radius of curvature of the second curved portion and (ii) a distance between the first end of the path and the second end of the path.

In an embodiment of the adjustable pliers, the performance parameter is defined, at least in part, by a fourth ratio of a radius of curvature of the first curved portion and one half of the width of the first end of the slot.

In an embodiment of the adjustable pliers, the fourth ratio has a value of 1.19 or 2.19.

In an embodiment of the adjustable pliers, the path of the slot is continuously curved.

In an embodiment of the adjustable pliers, the second curved portion extends to the second end of the path.

In an embodiment of the adjustable pliers, the performance parameter is defined, at least in part, by a first ratio of (i) the lateral offset and (ii) one half of a width of the first end of the slot, and wherein the first ratio has a value of 0.57 or 0.60.

In an embodiment of the adjustable pliers, the performance parameter is defined, at least in part, by a second ratio of (i) the longitudinal offset and (ii) a length of the second working tip along the second axis, and wherein the second ratio has a value of 1.35, 1.92, 1.60, or 2.26.

In an embodiment of the adjustable pliers, the performance parameter is defined, at least in part, by a third ratio of (i) an offset between the first end of the path and a center point of a radius of curvature of the second curved portion and (ii) a distance between the first end of the path and the second end of the path, and wherein the third ratio has a value of 0.27 or 0.33.

In an embodiment of the adjustable pliers, the performance parameter is defined, at least in part, by a fifth ratio of a radius of curvature of the second curved portion and one half of the width of the first end of the slot.

In an embodiment of the adjustable pliers, the fifth ratio has a value of 3.48 or 4.38.

In an embodiment of the adjustable pliers, the path of the slot includes a first linear portion between the first curved portion and the second curved portion, and a second linear portion between the second curved portion and the second end of the path.

In an embodiment of the adjustable pliers, the performance parameter is defined, at least in part, by a first ratio of (i) the lateral offset and (ii) one half of a width of the first end of the slot, and wherein the first ratio has a value of 1.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

The drawings are schematic and not necessarily to scale. In the drawings, similar symbols typically identify similar components, unless context dictates otherwise.

DETAILED DESCRIPTION

I. Introduction

Figure 1:
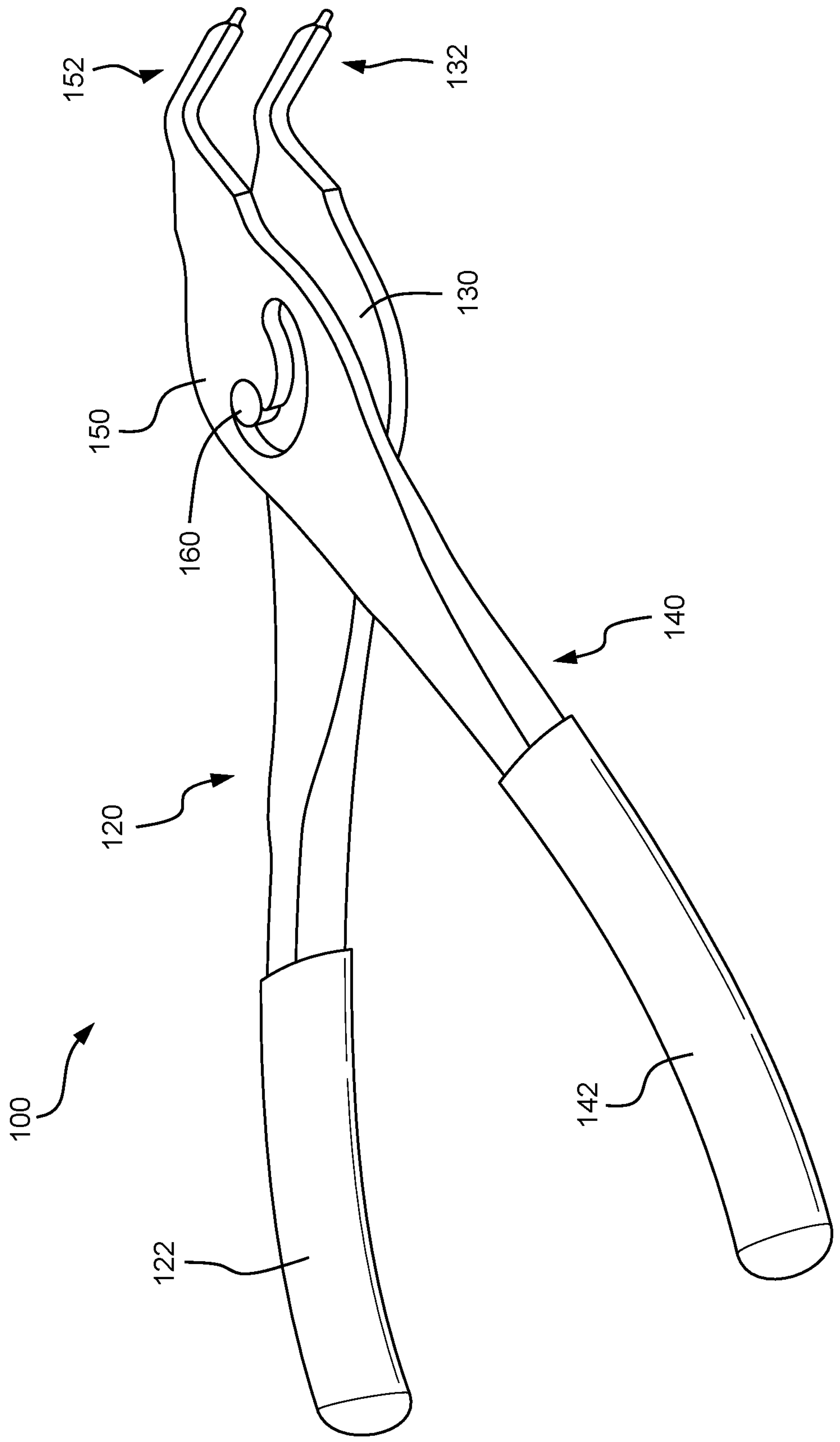
FIG. 1 shows a perspective view of adjustable pliers in accordance with an example embodiment.

This description describes several example embodiments, at least some of which pertain to adjustable pliers, such as retaining ring, or snap-ring pliers. Example pliers are formed by two halves with handles at a proximal end and working tips at a distal end. The two halves are rotatably coupled to one another via a stud. Squeezing the handles together moves the working tips. In a standard plier configuration, the plier halves cross a longitudinal axis that runs from the proximal end to the distal end, such that the working tip of each plier half (or halve) is on the opposite side of the longitudinal axis from the handle of that plier half. In this case, squeezing the handles together will move the working tips toward one another, similar to scissors. On the other hand, it is also possible to configure pliers to have a "reverse" or expanding configuration, such that squeezing the handles together moves the working tips away from each other. For example, where the working tip and handle of the first plier half is disposed on one side of the longitudinal axis and the working tip and handle of the second plier half is disposed on the other side of the longitudinal axis, squeezing the handles together will cause the working tips to separate. Adjustable pliers described herein may transition between the standard plier configuration and reverse configuration without separating the first plier half and the second plier half.

The standard and reverse plier configurations can be useful for various different applications. For example, both configurations can be used for placing and removing retaining rings, such as snap-rings. Pliers that close when squeezed may be used to contract an internal retaining ring for insertion inside a conduit or another ring-shaped structure. On the other hand, pliers that open when squeezed may be used to expand an external retaining ring and allow the external retaining ring to be slipped over a shaft or similar structure.

Example embodiments described herein include adjustable pliers having a second plier half with a slot for receiving a stud that is coupled to a first plier half. The slot extends on a path from a first end to a second end, where the first and second ends of the path are aligned with a lateral axis, or a first axis. Moreover, the second plier half extends from a handle to a working tip in a direction that is substantially aligned with the longitudinal axis, or a second axis, that is perpendicular to the lateral axis. A performance parameter is defined, at least in part, by a relationship between dimensions of the slot or of a working tip of the second plier half. In some embodiments, the performance parameter is one or more ratios of dimensions of the slot or of the working tip of the first plier half. Applicant has determined that the performance parameters described herein help to achieve better performance of the adjustable pliers. Beneficially, performance parameters described herein may enable a user to operate the adjustable pliers in a first working position and a second working position, such that a force on the adjustable pliers during operation pushes the stud into a slot end, rather than along the slot path. Further, performance parameters described herein may enable the first working tip and second working tip to cross in the transition between first and second working positions without tipping or contacting each other or with reduced tipping or contacting. As yet another example, performance parameters described herein may enable a smooth transition between the first working position and second working position.

II. Example Adjustable Pliers

FIGS. 1-4 show an embodiment of adjustable pliers that can be adjusted to have either a standard configuration or a reverse configuration by repositioning the location of the stud with respect to the plier halves. For example, FIG. 1 shows adjustable pliers 100 that include a first plier half 120 and a second plier half 140 that are coupled through a stud 160. The first plier half 120 includes a first handle 122, a first working tip 132, and a first joint body 130 between the first handle 122 and the first working tip 132. Likewise, the second plier half 140 includes a second handle 142, a second working tip 152, and a second joint body 150 between the second handle 142 and the second working tip 152.

Figure 2A:
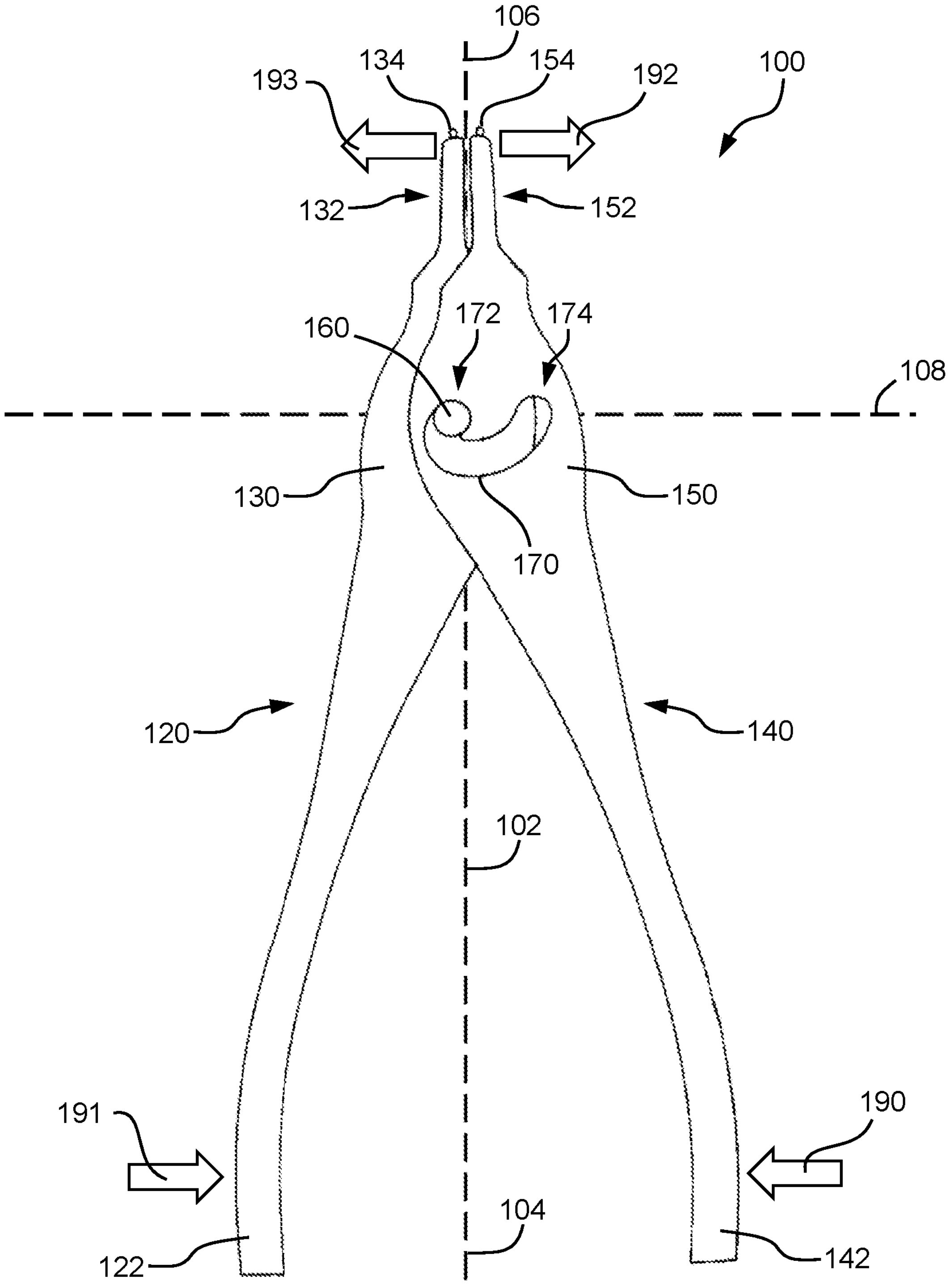
FIG. 2A shows a top plan view of adjustable pliers in a first working position in accordance with an example embodiment.

FIG. 2A shows adjustable pliers 100 in a first working position. The adjustable pliers 100 are shown substantially aligned with a longitudinal axis 102 with the first handle 122 and the second handle 142 disposed toward a proximal end 104 of longitudinal axis 102 and the first working tip 132 and the second working tip 152 disposed toward a distal end 106 of longitudinal axis 102.

As the adjustable pliers 100 open and close, the two plier halves 120, 140 rotate about the stud 160. Accordingly, the paths of the first handle 122, second handle 142, first working tip 132, and second working tip 152 as the adjustable pliers 100 are opened and closed are all arcs. However, in view of their respective positions near the proximal end 104 and distal end 106 of the longitudinal axis 102 when the adjustable pliers are being operated, the handles 122, 142 and working tips 132, 152, move substantially in a lateral direction illustrated by lateral axis 108.

In some embodiments, the stud 160 may be fixed. Fixed, as used herein, means in a set location with respect to the first plier half 120. Thus, in some embodiments, the stud 160 is rotatable even though it might be inserted into the first plier half 120 and be held at a particular location in the first plier half 120. Further, in some embodiments, the stud 160 may be entirely stationary with respect to the first plier half. For example, the stud 160 might be integrally formed with the first plier half 120.

Further, in some embodiments, a force applied to a handle of the adjustable pliers is substantially aligned with first and second directions at ends of a path of the slot. This force on a plier half urges the stud 160, which is coupled to the other plier half, in the opposite direction, i.e., into the end of the slot.

Figure 2B:
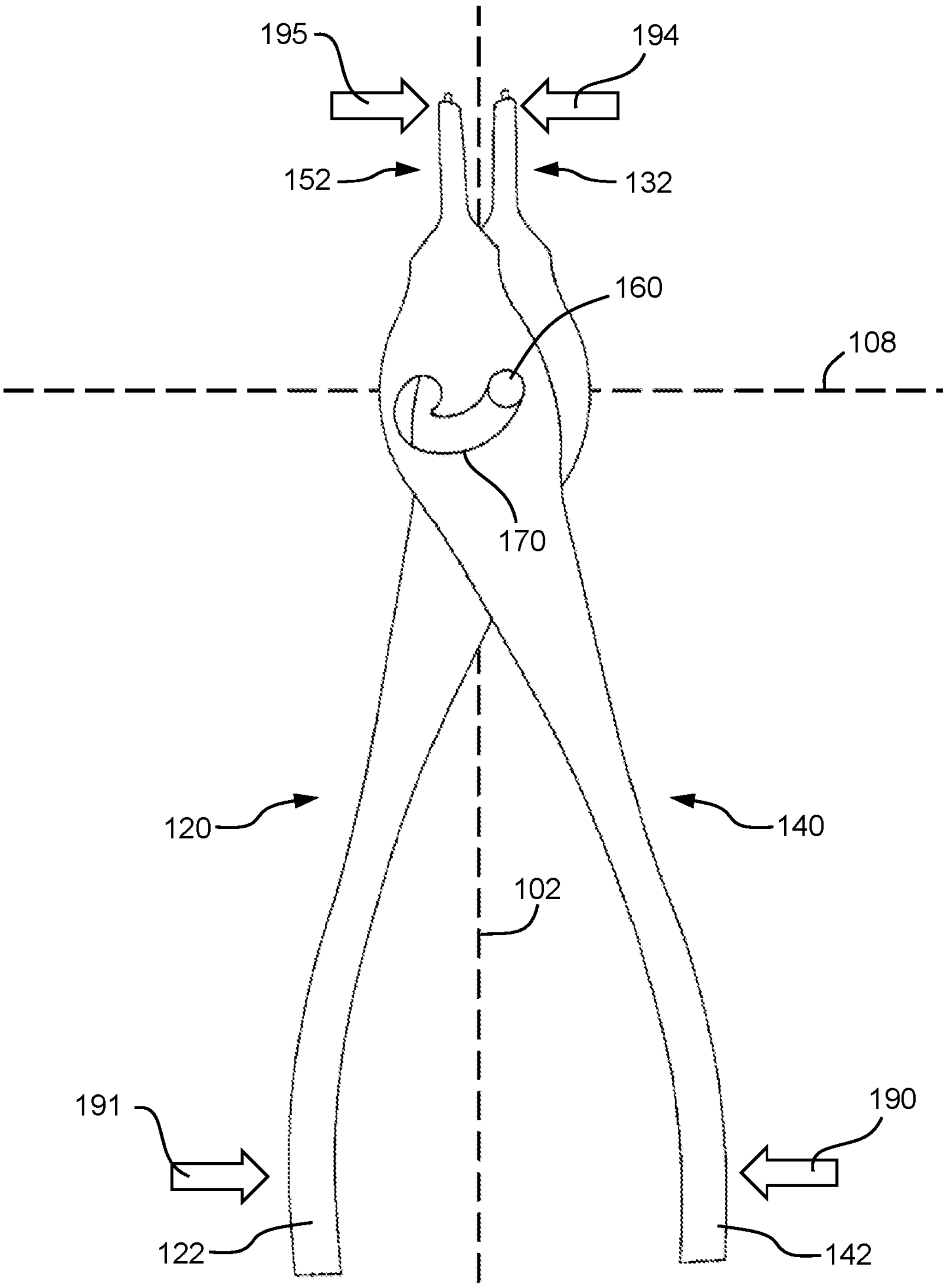
FIG. 2B shows a top plan view of adjustable pliers in a second working position in accordance with an example embodiment.

As illustrated in FIG. 2A, when the adjustable pliers 100 are arranged in the first position the first handle 122 and the first working tip 132 of the first plier half 120 are both positioned on the same side of the longitudinal axis 102. Similarly, the second handle 142 and the second working tip 152 are both positioned on the other side of the longitudinal axis 102. Accordingly, pushing the first handle 122 and the second handle 142 toward one another, also referred to herein as "squeezing" the adjustable pliers (depicted by arrows 190 and 191), causes the first working tip 132 and the second working tip 152 to move away from one another (depicted by arrows 192 and 193). On the other hand, when the adjustable pliers 100 are arranged in a second working position, as shown in FIG. 2B, the first plier half 120 and the second plier half 140 cross the longitudinal axis 102. Thus, the first handle 122 is positioned on one side of the longitudinal axis 102 while the first working tip 132 is positioned on the other side of the longitudinal axis 102. Likewise, the second handle 142 of the second plier half 140 is positioned on one side of the longitudinal axis 102 while the second working tip 152 is positioned on the other side of the longitudinal axis 102. In this configuration, pushing the first handle 122 and the second handle 142 toward one another causes the first working tip 132 and the second working tip 152 to move toward one another (depicted by arrows 194 and 195).

In order to switch the adjustable pliers 100 from the first position shown in FIG. 2A to the second position shown in FIG. 2B, the relative positions of the plier halves 120, 140 and stud 160 may be adjusted. This adjustment may be facilitated by moving the stud 160 through different positions in a slot 170 in the second plier half 140 that retains the stud 160. For example, when the adjustable pliers 100 are in the first working position shown in FIG. 2A, which is associated with a reverse configuration, where squeezing the handles 122, 142 causes the working tips 132, 152 to separate, the stud 160 is disposed at a first end 172 of the slot 170. On the other hand, when the stud 160 is moved to a second end 174 of the slot 170, the adjustable pliers 100 are in the second working position shown in FIG. 2B, which is associated with a standard configuration where squeezing the handles causes the working tips to come together.

Figure 3:
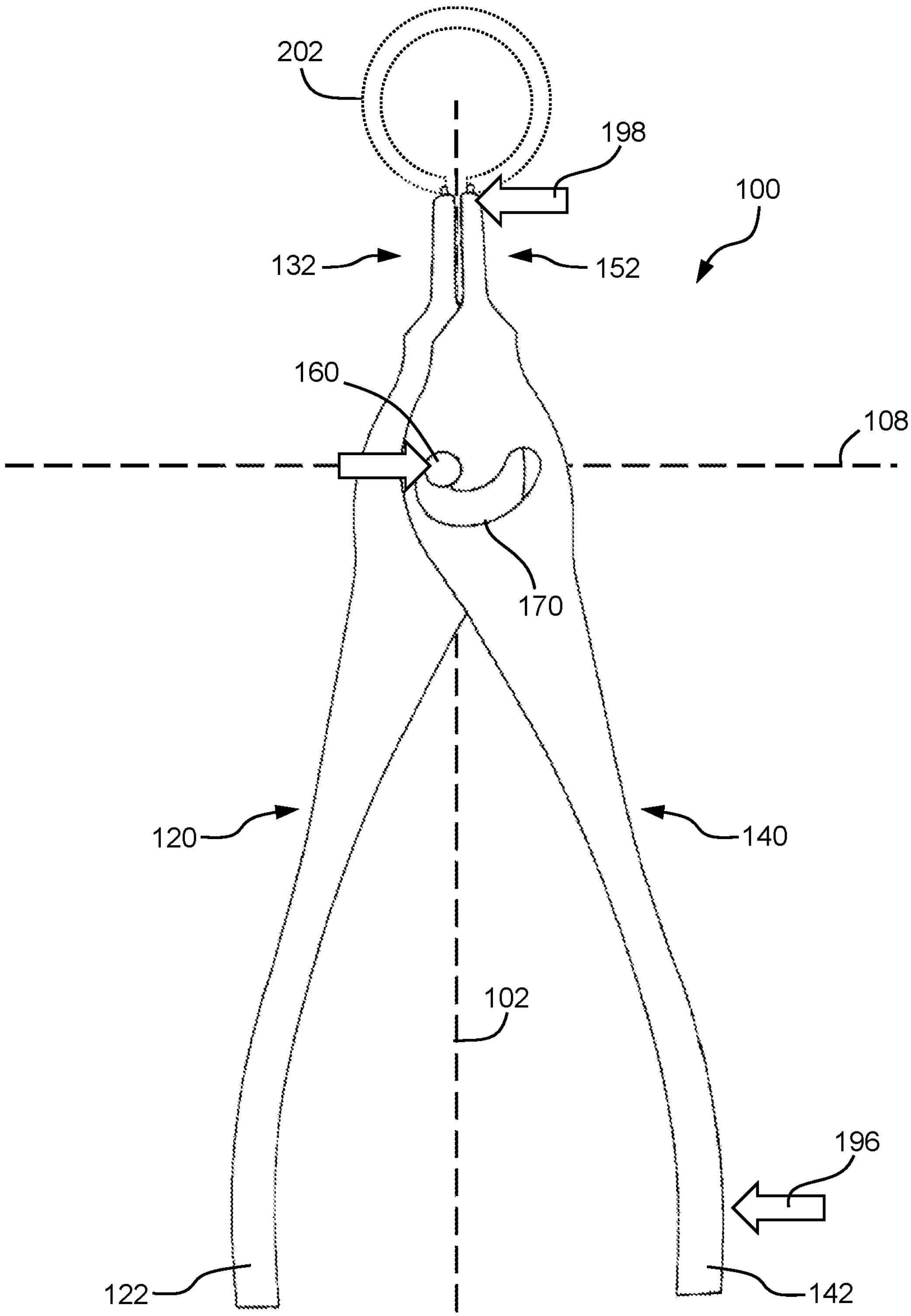
FIG. 3 shows another top plan view of adjustable pliers in the first working position coupled to a snap-ring in accordance with an example embodiment.
Figure 4:
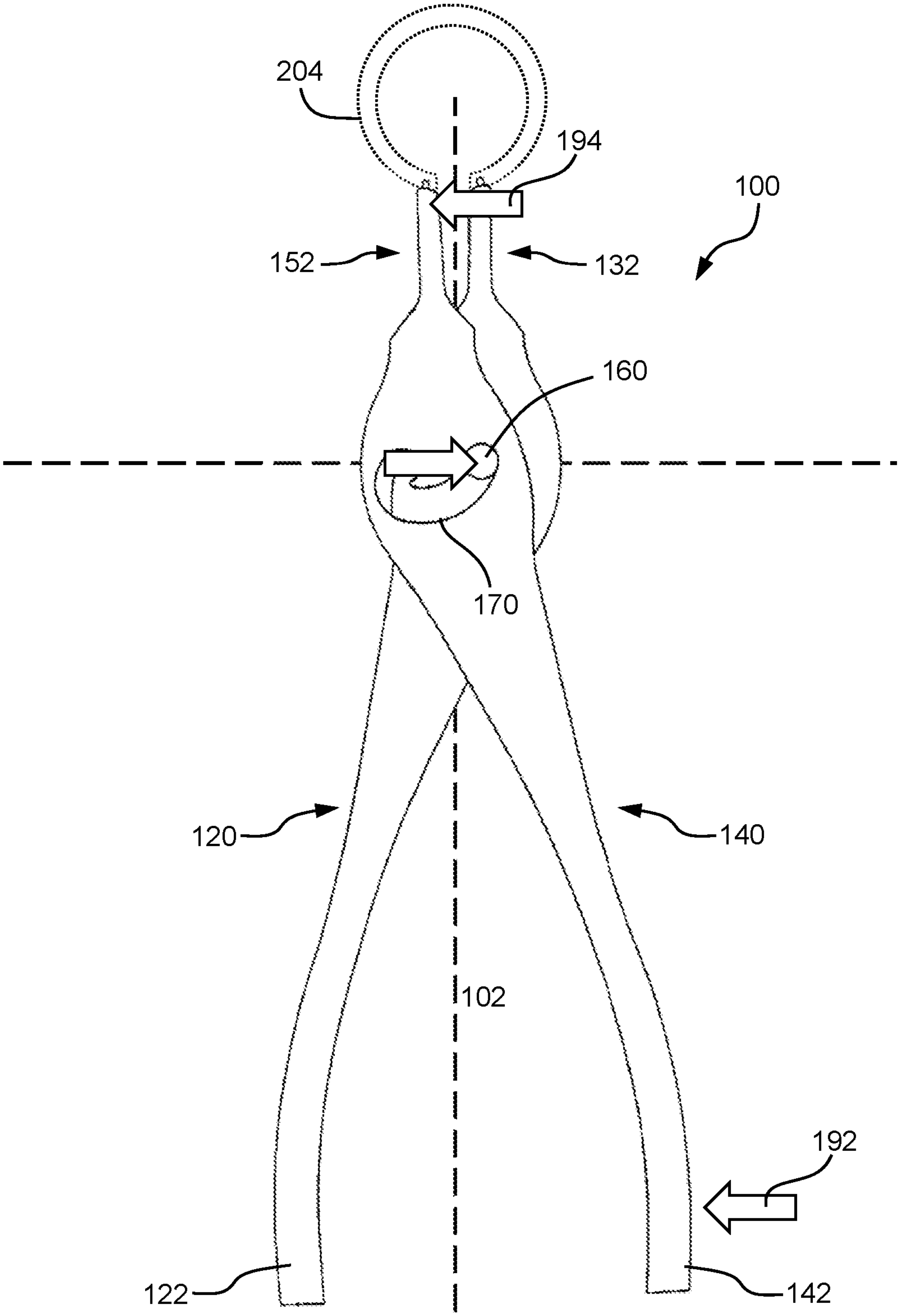
FIG. 4 shows another top plan view of adjustable pliers in the second working position coupled to a snap-ring in accordance with an example embodiment.

In both positions, the force on the second handle and the second working tip, during operation of the adjustable pliers is in a lateral direction, as shown in FIGS. 3 and 4. For example, in FIG. 3, where the adjustable pliers 100 are in the first working position, the second handle 142 is being pushed toward the first handle 122, i.e. to a first left direction 196, and the expanded external snap-ring 202 is trying to close, i.e., pushing the second working tip 152 also to a second left direction 198 parallel to the first left direction 196. In FIG. 4, where the adjustable pliers 100 are in the second working position, the second handle 142 is again being pushed toward the first handle 122, i.e., to the first left direction 196, and the internal snap-ring 204 is trying to expand, i.e., pushing on the second working tip 152 also to the second left direction 198.

Thus, during operation of the adjustable pliers 100 when in either the first working position or second working position, the second handle 142 is pushing on a right side of the stud 160. In order to hold the adjustable pliers 100 in either of the two working positions, both ends of the slot 170 may be advantageously closed on the right side and a path of the slot 170 may extend at least partially toward the left side. Accordingly, the force on the adjustable pliers 100 during operation pushes the stud 160 into one of the ends of the slot, rather than along the path of the slot.

Figure 5A:
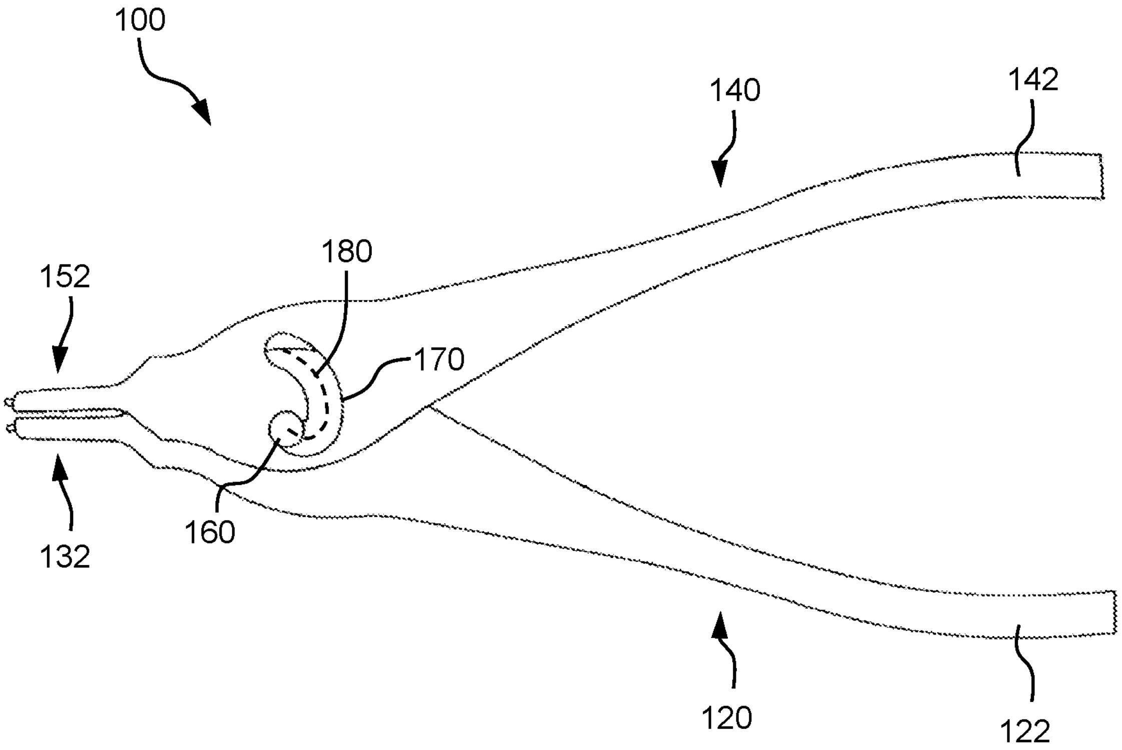
FIG. 5A shows another top plan view of adjustable pliers in the first working position in accordance with an example embodiment.
Figure 5B:
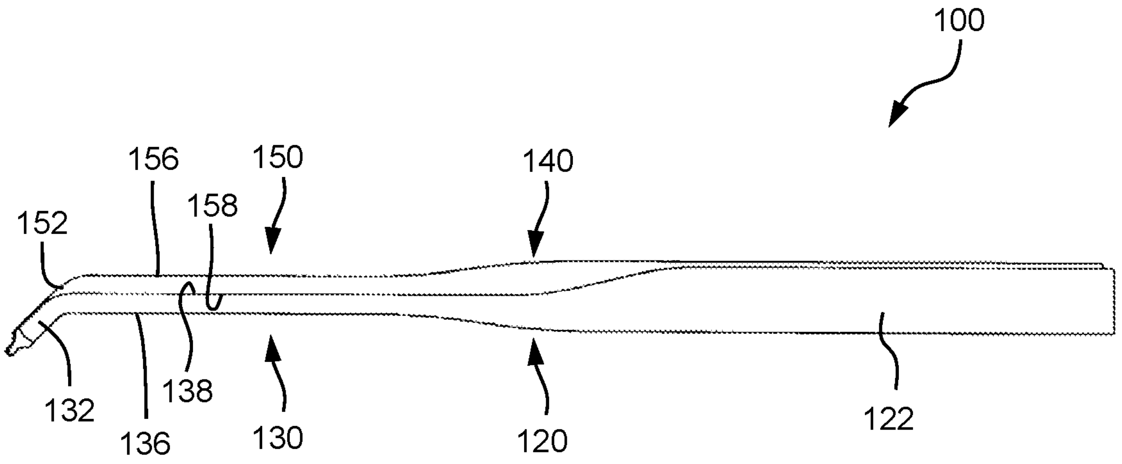
FIG. 5B shows a side view of adjustable pliers in the first working position in accordance with an example embodiment.
Figure 6A:
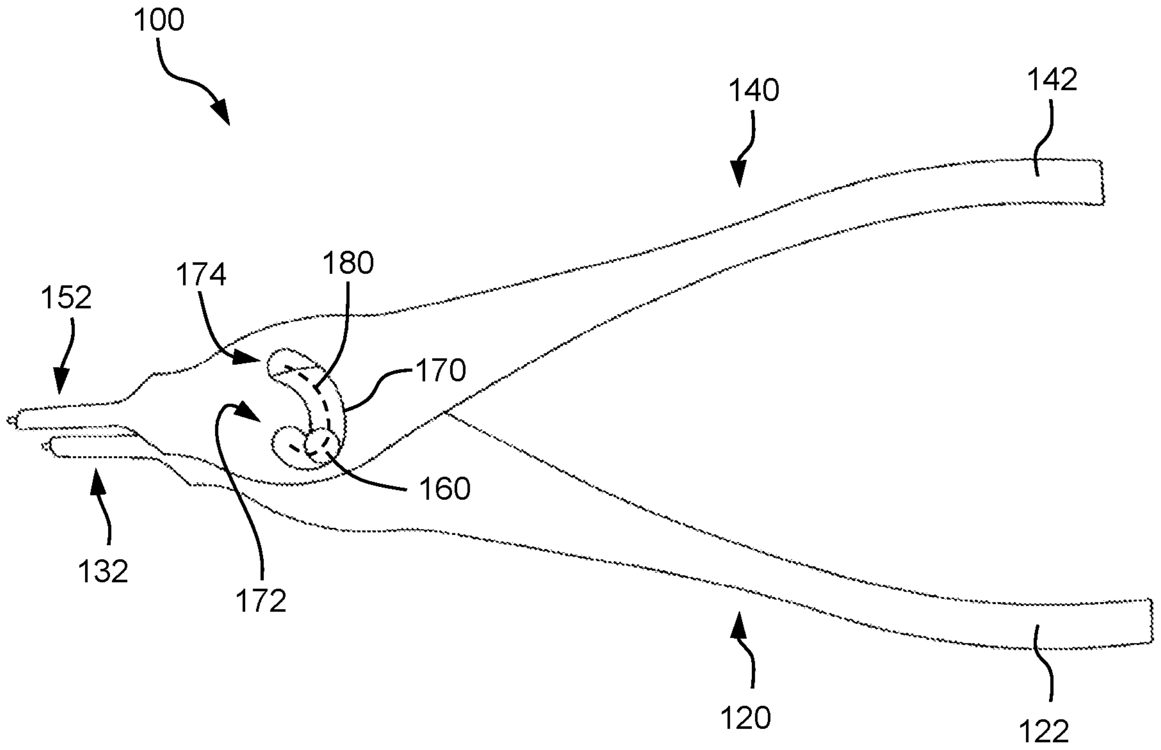
FIG. 6A shows a top plan view of adjustable pliers in a first transitioning position in accordance with an example embodiment.
Figure 6B:
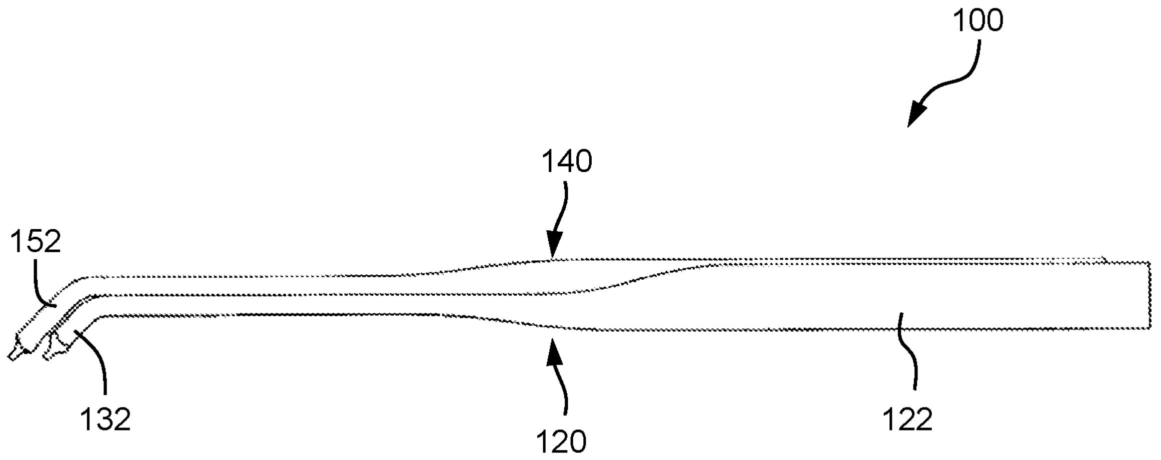
FIG. 6B shows a side view of adjustable pliers in the first transitioning position in accordance with an example embodiment.
Figure 7A:
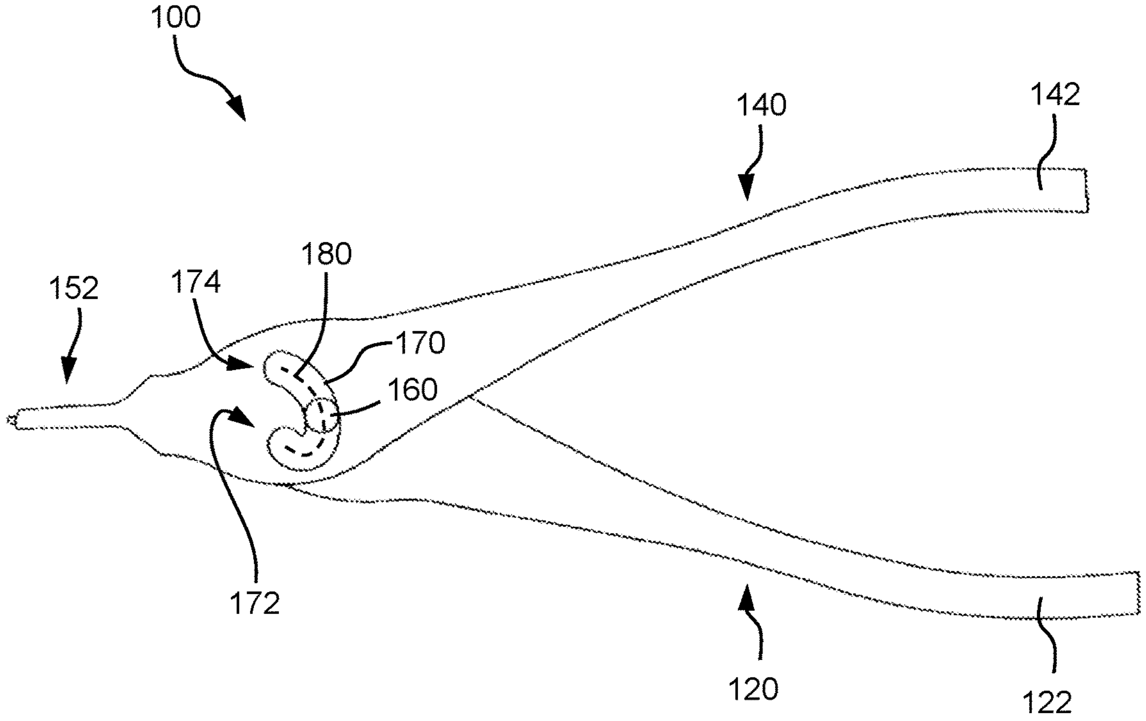
FIG. 7A shows a top plan view of adjustable pliers in a second transitioning position in accordance with an example embodiment.
Figure 7B:
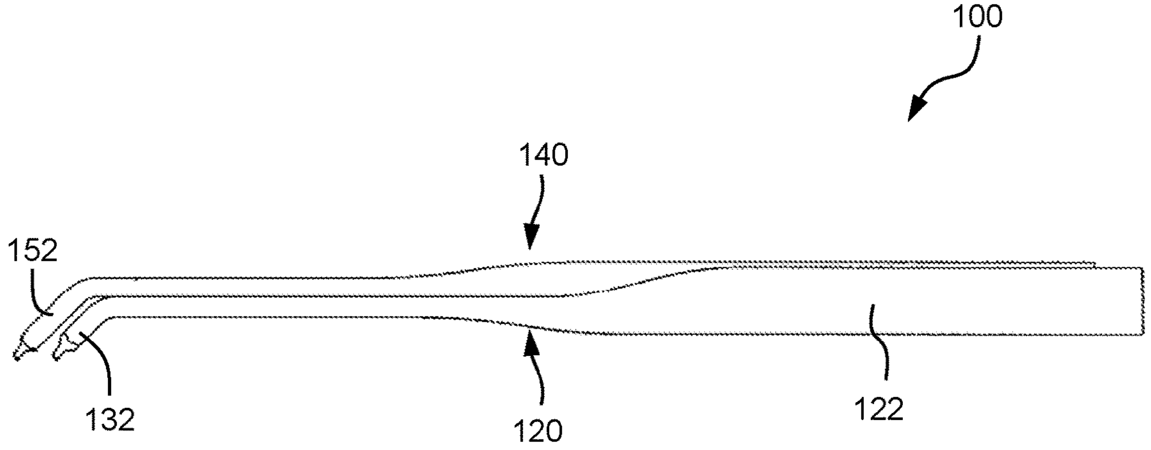
FIG. 7B shows a side view of adjustable pliers in the second transitioning position in accordance with an example embodiment.
Figure 8A:
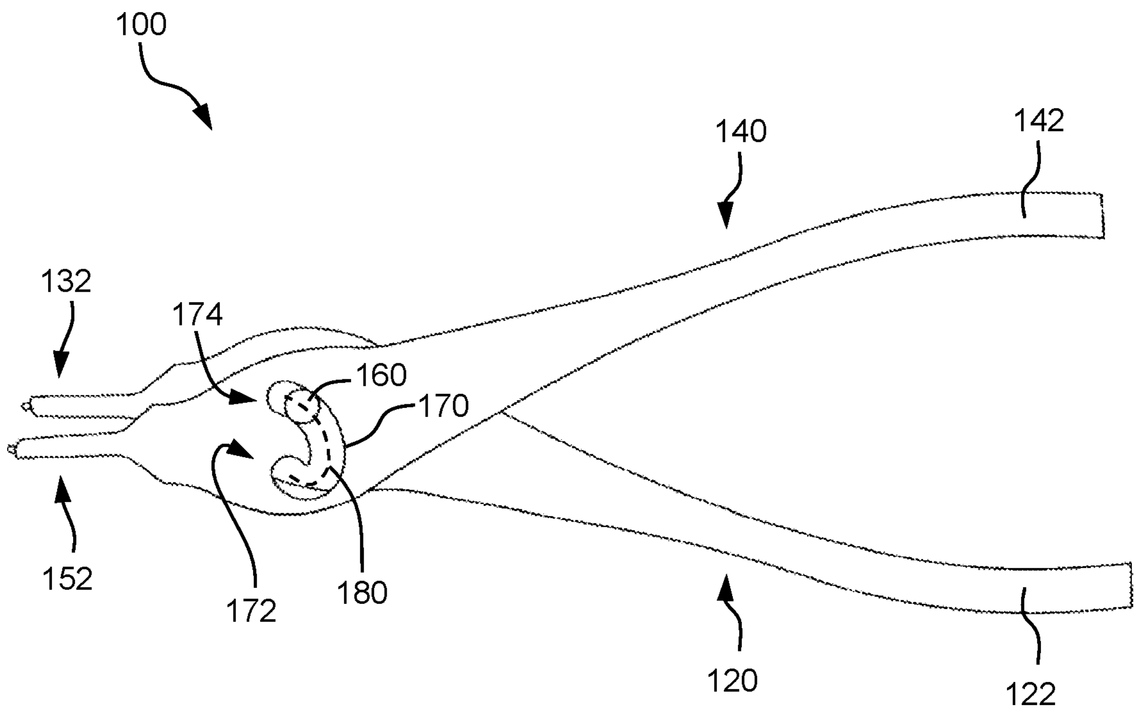
FIG. 8A shows a top plan view of adjustable pliers in a third transitioning position in accordance with an example embodiment.
Figure 8B:
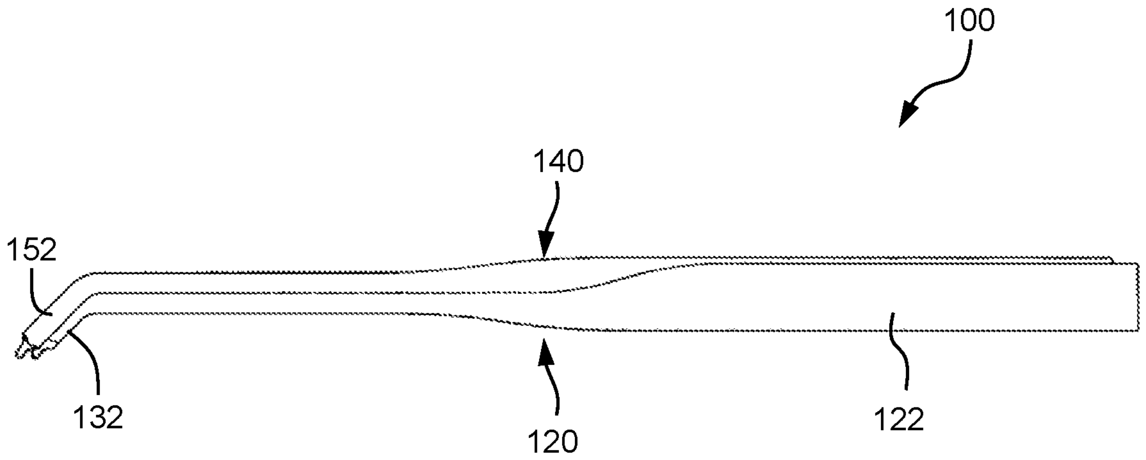
FIG. 8B shows a side view of adjustable pliers in the third transitioning position in accordance with an example embodiment.
Figure 9A:
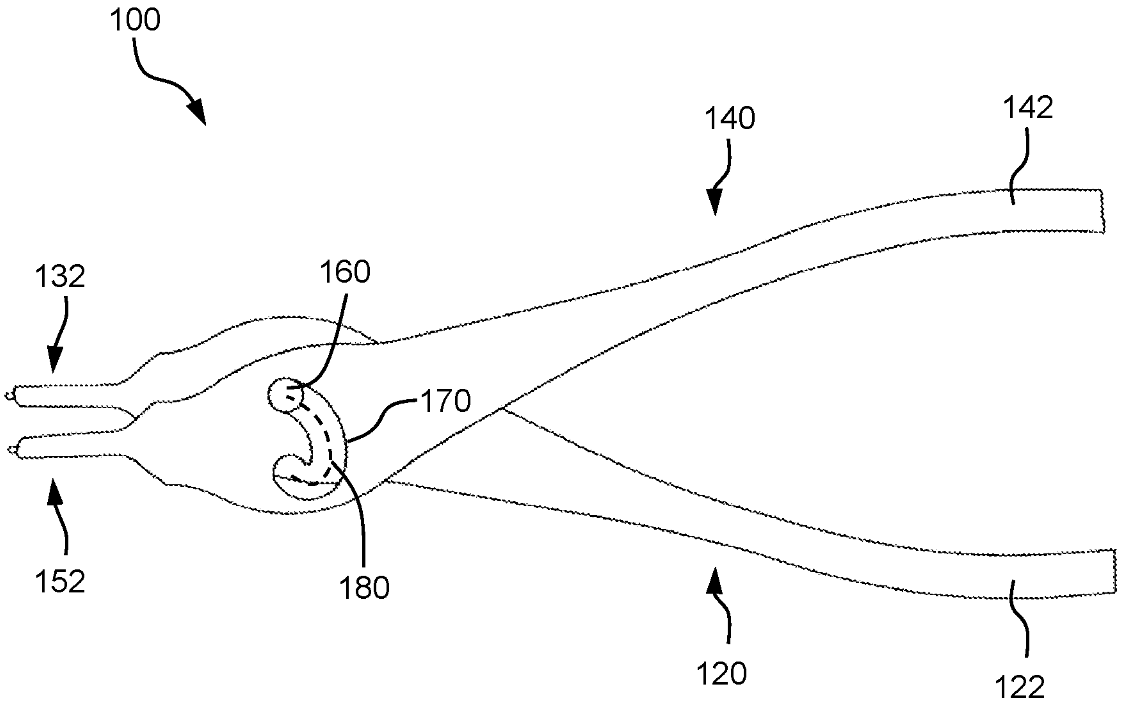
FIG. 9A shows another top plan view of adjustable pliers in the second working position in accordance with an example embodiment.
Figure 9B:
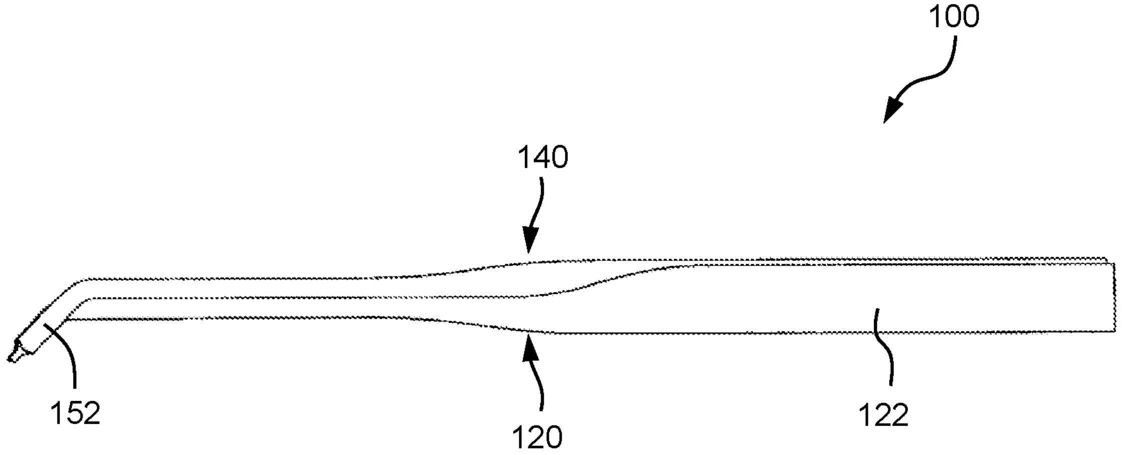
FIG. 9B shows a side view of adjustable pliers in the second working position in accordance with an example embodiment.

The adjustable pliers may transition from the first working position to the second working position. FIGS. 5A and 5B show the adjustable pliers 100 in the first working position, FIGS. 9A and 9B show the adjustable pliers 100 in the second working position, and FIGS. 6A to 8A and 6B to 8B show the adjustable pliers transitioning from the first working position to the second working position.

In the transition between the first and second working positions, the stud 160 moves along a path 180 of the slot 170. In particular, in FIG. 6A, the adjustable pliers 100 are in a first transitioning position, where the stud 160 is in a first transitioning position on path 180 of the slot 170. In the first transitioning position, the stud 160 is closer to a first end 172 of the slot 170 than the second end 174 of the slot 170. Further, in FIG. 7A, the adjustable pliers 100 are in a second transitioning position, where the stud 160 is in a second transitioning position on the path 180 of the slot 170. The second position in the path 180 is closer to the second end 174 of the slot 170 than the first position in the path 180. Moreover, in FIG. 8A, the adjustable pliers 100 are in a third transitioning position, where the stud 160 is in a third transitioning position on the path 180 of the slot 170. In the third transitioning position, the stud 160 is closer to the second end 174 of the slot 170 than the first end 172 of the slot 170.

In the transition between the first and second working positions, the working tips 132 and 152 move relative to each other. In particular, the first working tip 132 and the second working tip 152 cross without tipping or contacting each other, as shown in FIGS. 6B to 8B.

Figure 10B:
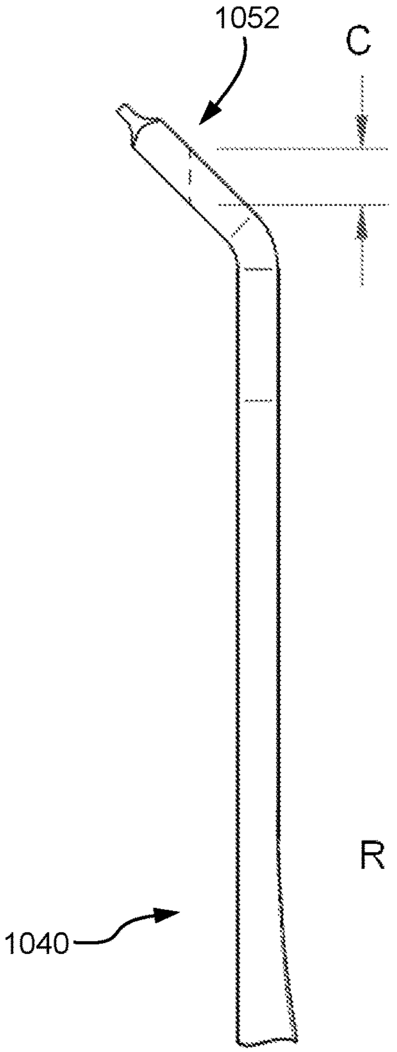
FIG. 10B shows a side view of aspects of the second plier half shown in FIG. 10A in accordance with an example embodiment.
Figure 10A:
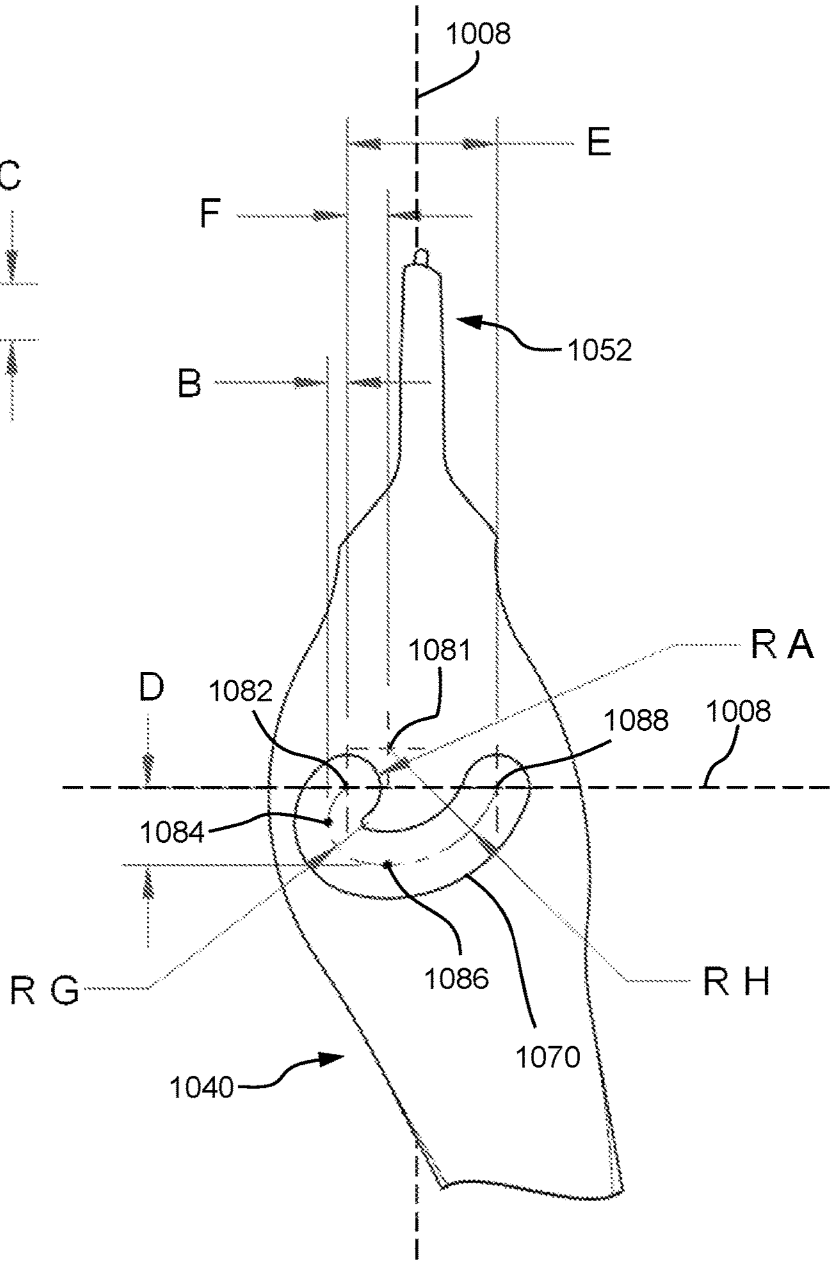
FIG. 10A shows a top plan view of aspects of a second plier half having a continuously curved slot in accordance with an example embodiment.
Figure 10C:
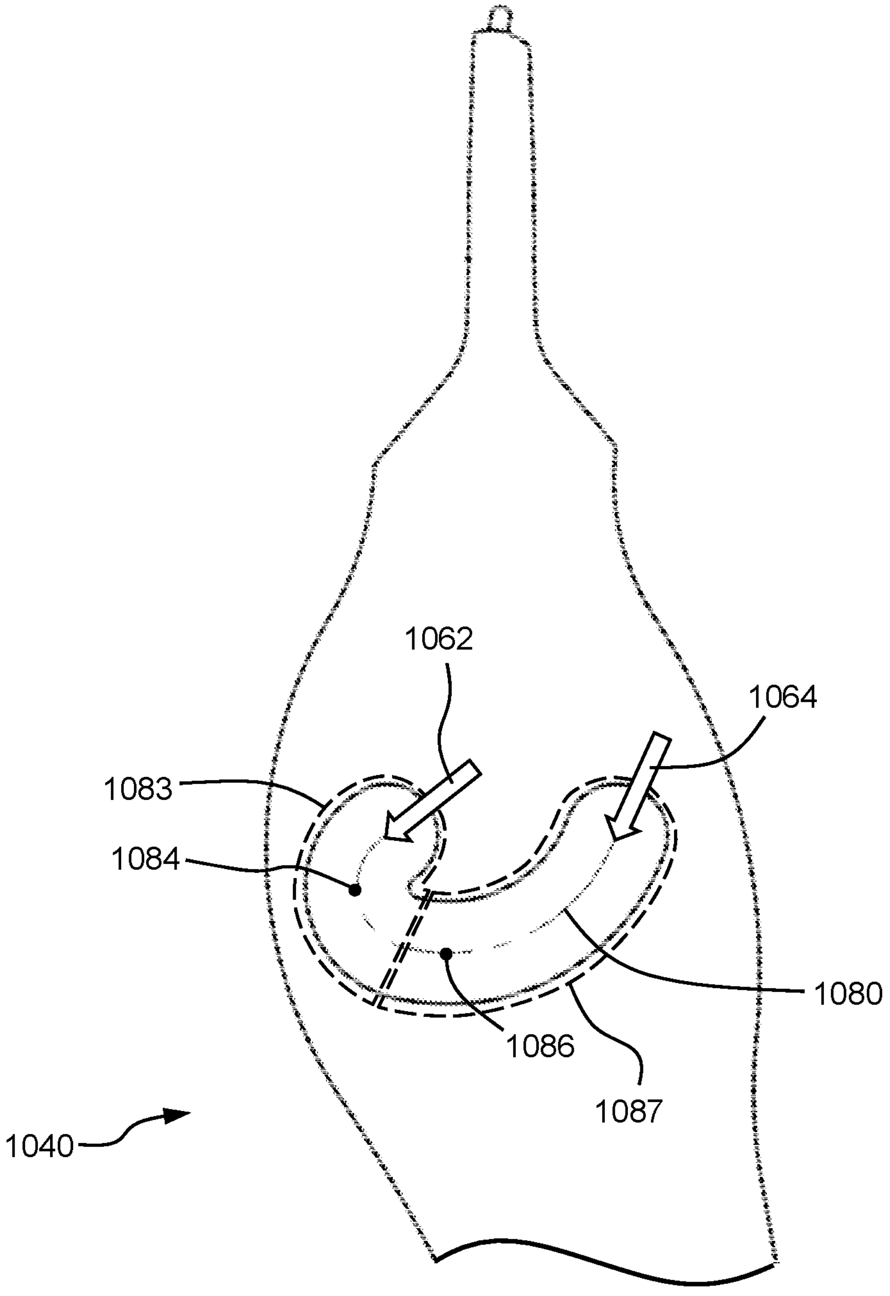
FIG. 10C shows another top plan view of aspects of the second plier half shown in FIG. 10A in accordance with an example embodiment.

FIGS. 10A to 10C show aspects of a second plier half 1040 having a slot 1070 and a second working tip 1052. The slot 1070 has a path 1080 that is continuously curved. The second working tip 1052 has a cross-sectional length C.

The slot 1070 in the second plier half 1040 is formed by a bore having a radius, such that the slot 1070 has a width. As illustrated in FIG. 10A, the path 1080 includes a first end 1082 and a second end 1088. As shown in FIG. 10C, the path 1080 extends in a first direction 1062 at the first end 1082 of the path 1080 and extends in a second direction 1064 substantially parallel to the first direction 1062 at the second end 1088 of the path 1080. The first end 1082 and the second end 1088 of the path 1080 are aligned on a lateral axis 1008.

From the first end 1082 of the path 1080, the path 1080 extends to a lateral outermost position 1084 that is spaced from the first end 1082 of the path 1080, with respect to the lateral axis 1008, by a lateral offset B. At the lateral outermost position 1084, the path 1080 of the slot 1070 extends along a first curved portion 1083 (see FIG. 10C).

From the lateral outermost position 1084, the path 1080 of the slot 1070 extends to a most proximal position 1086 that is spaced from the first end 1082 of the path 1080, with respect to a longitudinal axis 1002, by a longitudinal offset D. The longitudinal offset D allows the second working tip 1052 to pass a working tip of a first plier half, and is thus greater than a cross-sectional length of the second working tip 1052, as described above. At the most proximal position 1086 of the path 1080, the path 1080 extends along a second curved portion 1087 (see FIG. 10C).

Thus, the path 1080 extends from the first end 1082 to the lateral outermost position 1084, from the lateral outermost position 1084 to the most proximal position 1086, and from the most proximal position 1086 to the second end 1088. In some embodiments, the most proximal position 1086 is between the first end 1082 and second end 1088 with respect to the lateral axis 1008. As shown in FIGS. 10A and 10C, the lateral outermost position 1084 is disposed on the first curved portion 1083, and the most proximal position is disposed on the second curved portion 1087. Further, the second curved portion 1087 extends to the second end 1088.

A performance parameter may be defined, at least in part, by a first ratio of the lateral offset B and one half of the width of the slot 1070, which may be represented as radius R A. In some embodiments, the bore radius may be the same across the slot 1070. In other embodiments, the bore radius may vary. The first ratio may be referred to as a hook ratio. In some embodiments, the first ratio defines a hook shape of the slot, which holds the orientation of the second plier half 1040 and first plier half in the first working position and second working position.

Further, a performance parameter may be defined, at least in part, by a second ratio of the longitudinal offset D and the cross-sectional length C. The second ratio may be referred to as a tip movement ratio. In some embodiments, the second ratio defines clearance for the second working tip 1052 and the working tip of the first plier half to cross in the transition between the first and second working positions. Moreover, in some embodiments, the crossing of the working tips may be achieved without tipping or contacting each other or with reduced tipping or contacting. Further, in some embodiments, a smooth transition between the first working position and second working position may be achieved. In some embodiments, the performance parameter is defined by both the first ratio and the second ratio.

As illustrated in FIG. 10A, there is a distance E between the first end 1082 of the path 1080 and the second end 1088 of the path 1080, along the lateral axis 1008. Further, a center point 1081 of the radius of curvature of the second curved portion 1087 is positioned, with respect to the lateral axis 1008, between the first end 1082 of the path 1080 and the second end 1088 of the path 1080. There is an offset F, along the lateral axis 1008, between the first end 1082 of the path 1080 and the center point 1081 of the radius of curvature of the second curved portion 1087. Put another way, the offset F is also the distance between the first end 1082 of the path 1080 and the most proximal position 1086 of the path 1080 with respect to the lateral axis 1008.

A performance parameter is defined, at least in part, by a third ratio of (i) the offset F and (ii) the distance E. The third ratio defines the relative position of the most proximal position 1086 between the first end 1082 of the path 1080 and the second end 1088 of the path 1080 with respect to the lateral axis 1008. In some embodiments, the performance parameter is defined by at least two of the first ratio, the second ratio, and the third ratio. Further, in some embodiments, the performance parameter is defined by the first ratio, the second ratio, and the third ratio.

The first ratio, second ratio, and third ratio may have a range of values. For example, the first ratio may have a value in a range of around 0.55 to around 1.10, including 0.55 to 1.10. "Around," as used in herein, means above or below the stated numerical value by a variance of 10 percent. As another example, the second ratio may have a value in a range of around 1.03 to around 2.28, including 1.03 to 2.28. As yet another example, the third ratio may have a value in range of around 0.26 to around 0.35, including 0.26 to 0.35.

Figure 11:
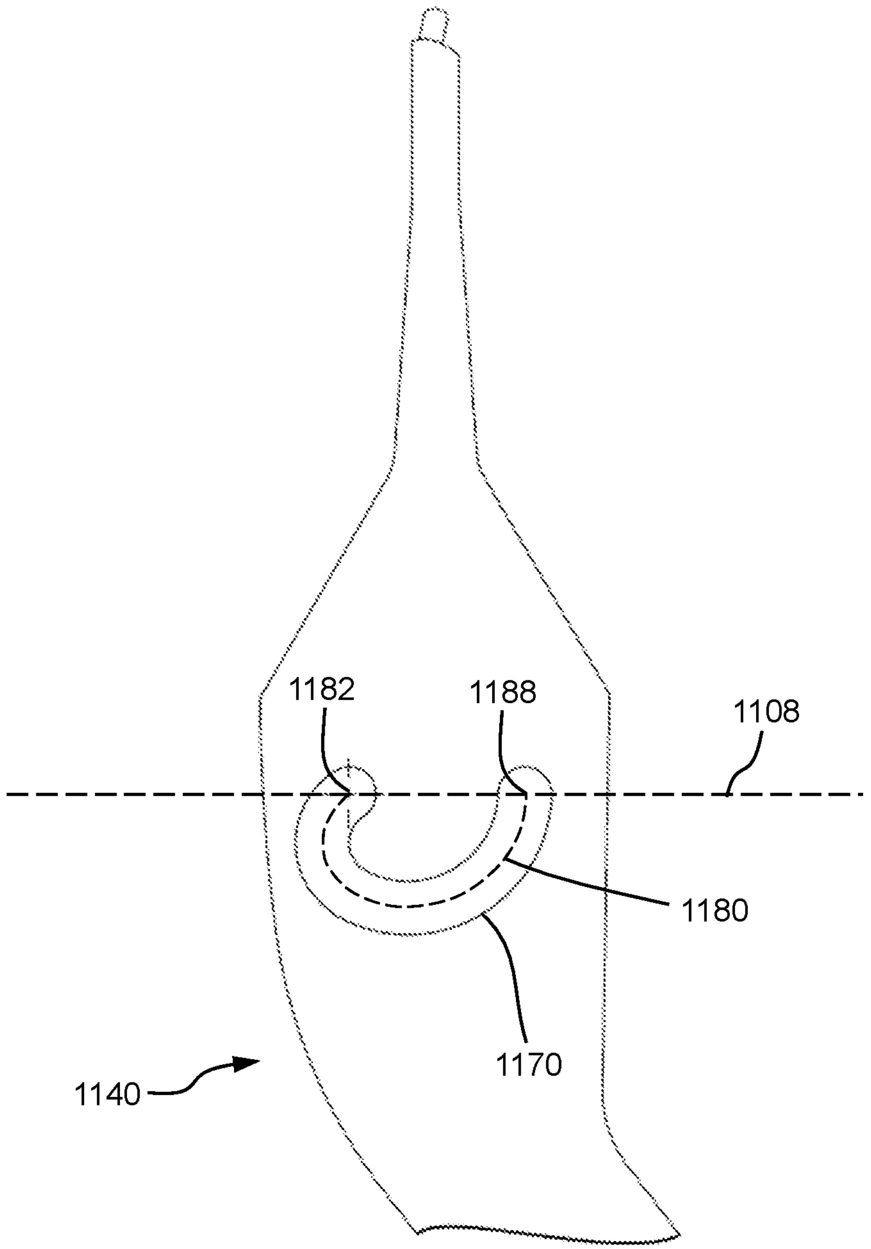
FIG. 11 shows a top plan view of aspects of a second plier half having another continuously curved slot in accordance with an example embodiment.

FIG. 11 shows aspects of a second plier half 1140 having a slot 1170. The slot 1170 has a path 1180 that is continuously curved. As illustrated in FIG. 11, the path 1180 includes a first end 1182 and a second end 1188. The path 1080 extends in a first direction at the first end 1082 of the path 1080 and extends in a second direction substantially parallel to the first direction at the second end 1188 of the path 1180. The first end 1182 and the second end 1188 of the path 1180 are aligned with a lateral axis 1108.

Second plier halves and slots described herein may have different shapes based on the values of the first ratio, second ratio, or third ratio. For example, a second plier half and slot may take the form of or be similar in form to the second plier half 1040 and slot 1070 when the first ratio has a value of around 0.55, the second ratio has a value of around 1.03, and the third ratio has a value of around 0.26. As another example, a second plier half and slot may take the form of or be similar in form to the second plier half 1140 and slot 1170 when the first ratio has a value of around 1.10, the second ratio has a value of around 2.28, and the third ratio has a value of around 0.35.

A performance parameter may be defined, at least in part, by a fourth ratio of a radius of curvature R G of the first curved portion 1083 and radius R A. In some embodiments, the performance parameter is defined by at least by at least two of the first ratio, the second ratio, the third ratio, and fourth ratio. Further, in some embodiments, the performance parameter is defined by the first ratio, the second ratio, the third ratio, and the fourth ratio. In some embodiments, the fourth ratio has value of around 1.19 or around 2.19.

Further, a performance parameter may be defined, at least in part, by a fifth ratio of a radius of curvature R H of the second curved portion 1087. In some embodiments, the performance parameter is defined by at least two of the first ratio, the second ratio, the third ratio, the fourth ratio, and the fifth ratio. Further, in some embodiments, the performance parameter is defined by the first ratio, the second ratio, the third ratio, the fourth ratio, and the fifth ratio. In some embodiments, the fifth ratio has a value of around 3.48 or around 4.38.

Figure 12B:
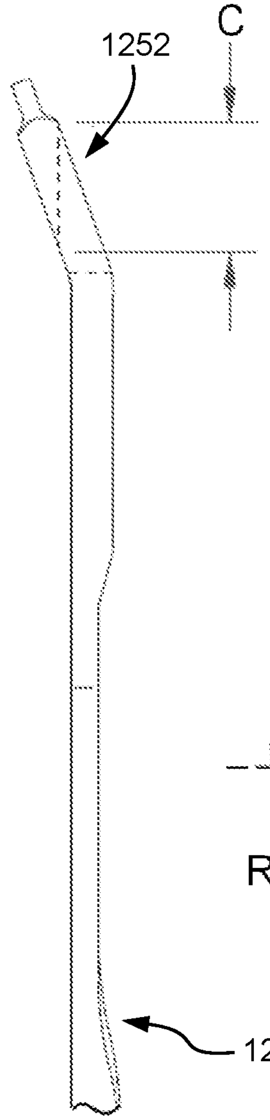
FIG. 12B shows a side view of aspects of the second plier half shown in FIG. 12A in accordance with an example embodiment.
Figure 12A:
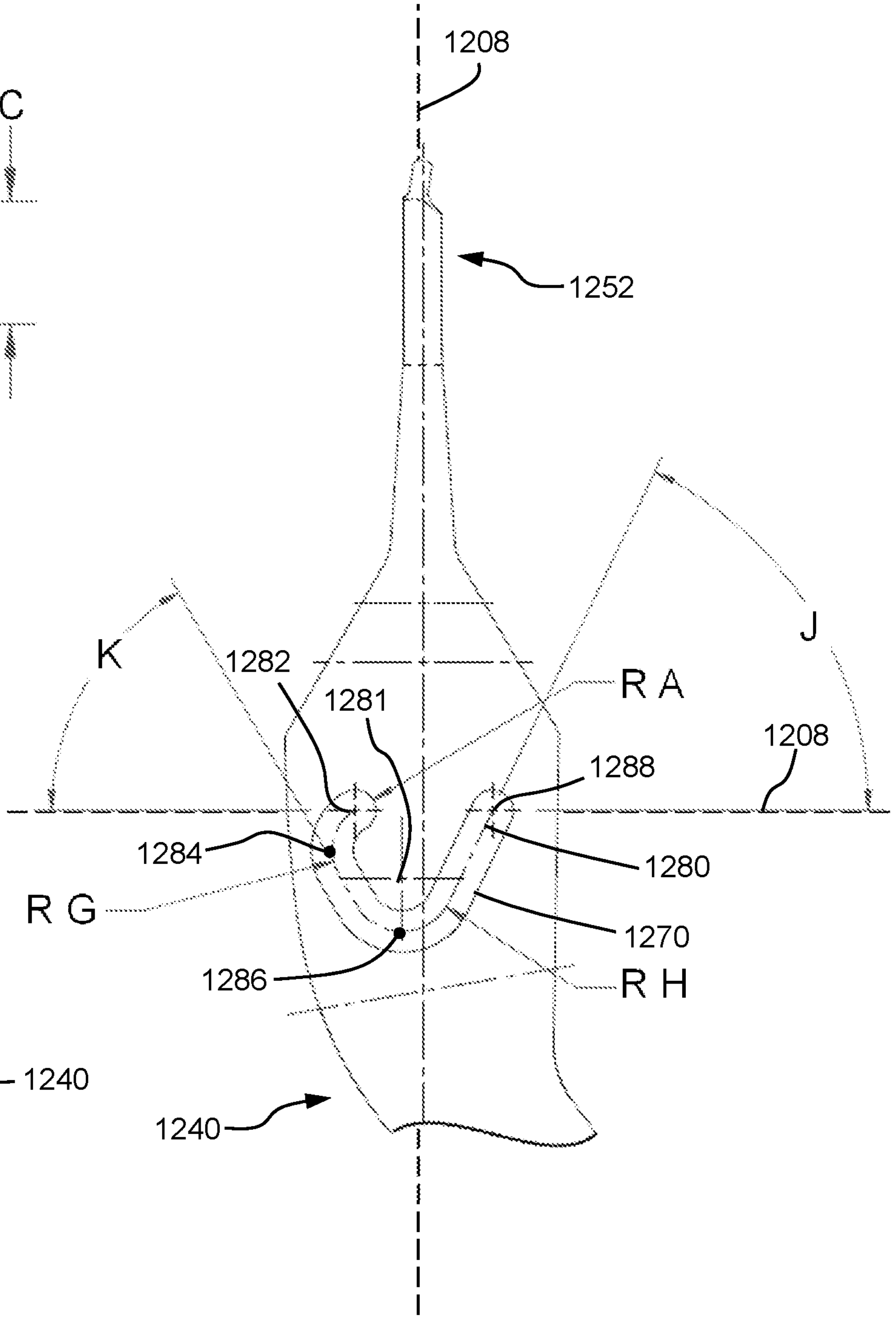
FIG. 12A shows a top plan view of aspects of a second plier half having a slot including two linear portions in accordance with an example embodiment.
Figure 12C:
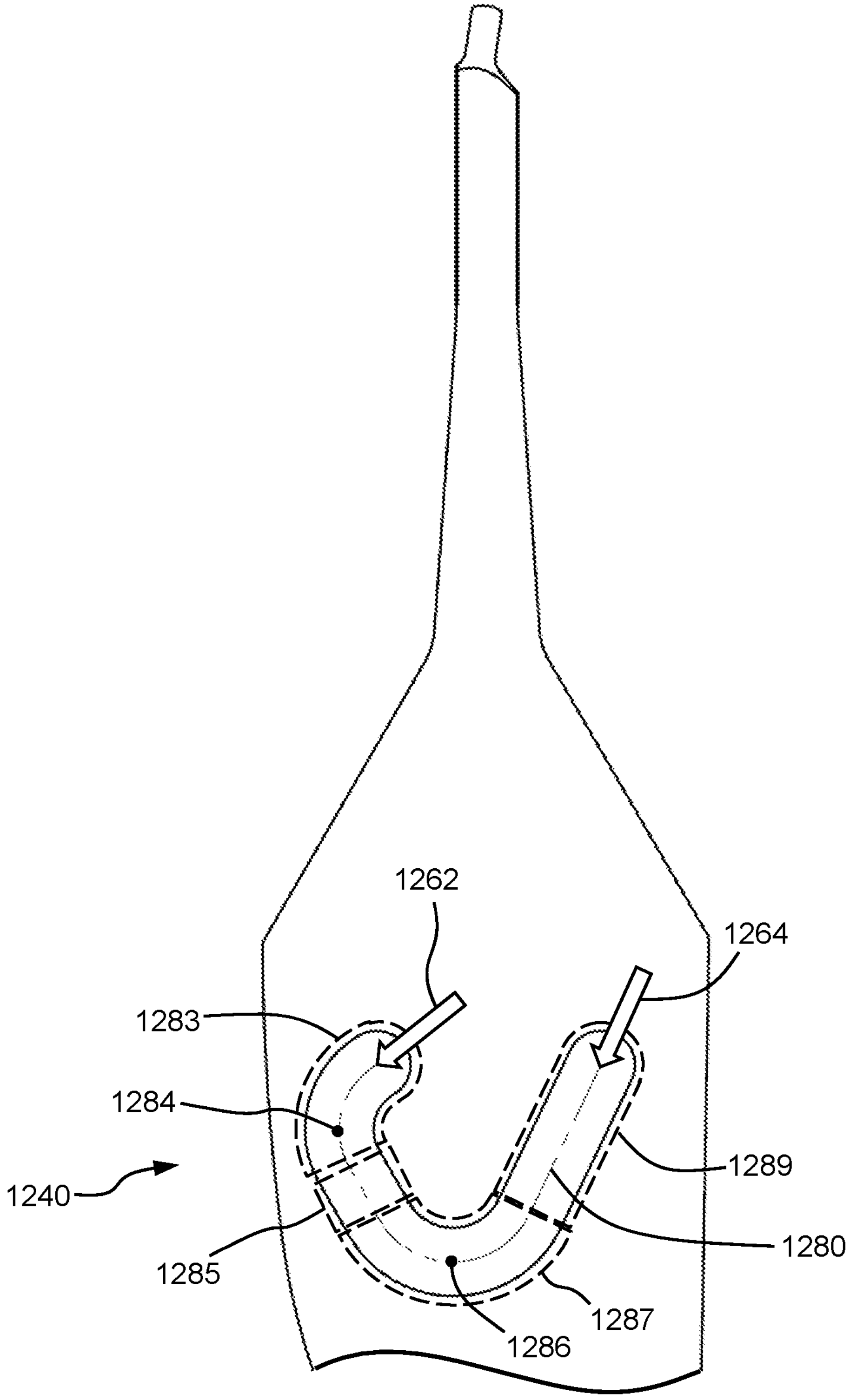
FIG. 12C shows another top plan view of aspects of the second plier half shown in FIG. 10A in accordance with an example embodiment.

FIGS. 12A to 12C show aspects of a second plier half 1240 having a slot 1270 and a second working tip 1252. The slot 1270 has a path 1280 and includes two linear portions. The second working tip 1252 has a cross-sectional length C.

The slot 1270 in the second plier half 1240 is formed by a bore having a radius, such that the slot 1270 has a width. One half of the width of the slot 1270 may be represented as radius R A. In some embodiments, the bore radius may be the same across the slot 1270. In other embodiments, the bore radius may vary. As illustrated in FIG. 12A, the path 1280 includes a first end 1282 and a second end 1288. As illustrated in FIG. 12C, the path 1280 extends in a first direction 1262 at the first end 1282 of the path 1280 and extends in a second direction 1264 substantially parallel to the first direction 1262 at the second end 1288 of the path 1280. The first end 1282 and the second end 1288 of the path 1280 are aligned with a lateral axis 1208.

From the first end 1282 of the path 1280, the path 1280 extends to a lateral outermost position 1284 that is spaced from the first end 1282 of the path 1280, with respect to the lateral axis 1208, by a lateral offset similar to the lateral offset B. There is an angle K between the lateral outermost position 1284 and the lateral axis 1208. In some embodiments, the angle K is around 60 degrees. At the lateral outermost position 1284, the path 1280 of the slot 1270 extends along a first curved portion 1283 having a radius of curvature R G.

From the lateral outermost position 1284, the path 1280 of the slot 1270 extends to a most proximal position 1286 that is spaced from the first end 1282 of the path 1280, with respect to a longitudinal axis 1202, by a longitudinal offset similar to longitudinal offset D. The longitudinal offset allows the second working tip 1252 to pass a working tip of a first plier half, and is thus greater than the cross-sectional length of the second working tip 1252, as described above. As shown in FIG. 12C, at the most proximal position 1286 of the path 1280, the path 1280 extends along a second curved portion 1287 having a radius of curvature R H.

Thus, the path 1280 extends from the first end 1282 to the lateral outermost position 1284, from the lateral outermost position 1284 to the most proximal position 1286, and from the most proximal position 1286 to the second end 1288. There is an angle J between the second end 1288 of the path 1280 and the lateral axis 1208. In some embodiments, the angle J is around 60 degrees. The slot 1270 includes a first linear portion 1285 between the first curved portion 1283 and the second curved portion 1287, and a second linear portion 1289 between the second curved portion 1287 and the second end 1288 of the path 1280.

As illustrated in FIG. 12A, there is a distance between the first end 1282 of the path 1280 and the second end 1288 of the path 1280, along the lateral axis 1208 similar to the distance D. Further, a center point 1281 of the radius of curvature of the second curved portion is positioned, with respect to the lateral axis 1208, between the first end 1282 of the path 1280 and the second end 1288 of the path 1280. There is an offset, along the lateral axis 1208, between the first end 1282 of the path 1280 and the center point 1281 of the radius of curvature of the second curved portion 1287 similar to the offset F.

A performance parameter for the adjustable pliers illustrated in FIG. 12A to 12C may be defined the same or similar way as the performance parameter is defined for the adjustable pliers illustrated in FIG. 10A to 10C. In some embodiments, the first ratio has a value of around 1. Further, in some embodiments, the second ratio has a value of around 1.05. Moreover, in some embodiments, the third ratio has a value around of 0.34. Further, in some embodiments, the fifth ratio has a value around 1.39 or around 2.49.

Figure 13:
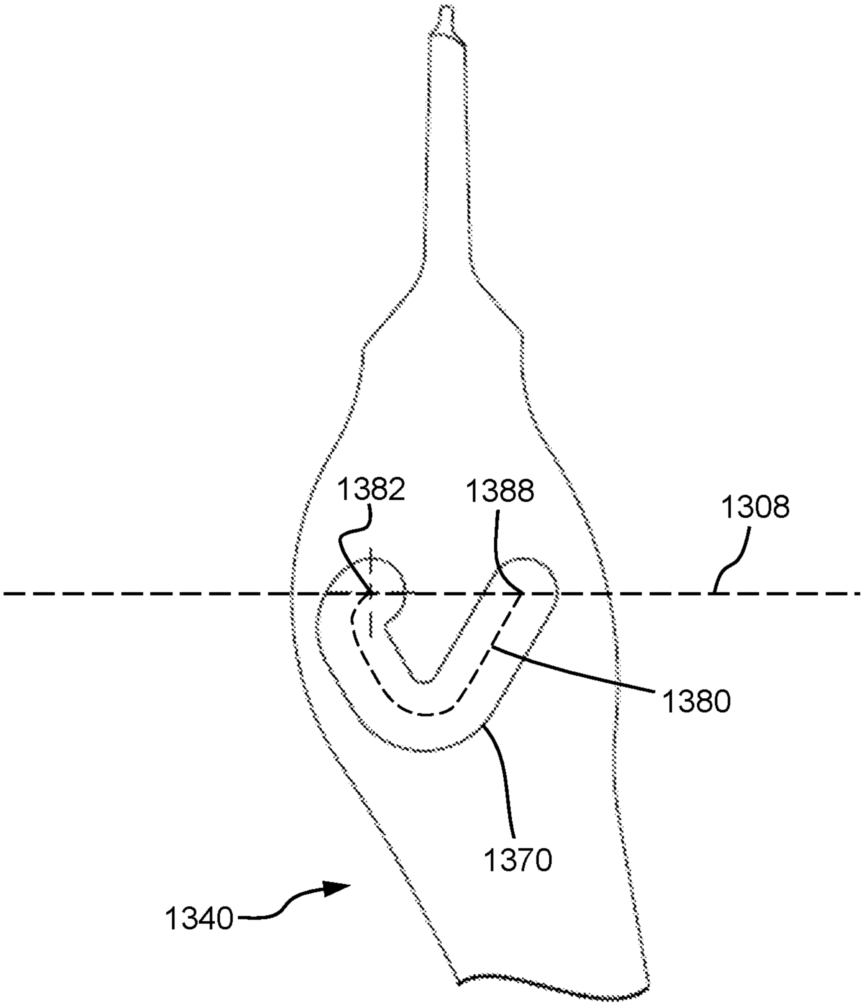
FIG. 13 shows a top plan view of aspects of a second plier half having another slot including two linear portions in accordance with an example embodiment.

FIG. 13 shows aspects of a second plier half 1340 having a slot 1370. The slot 1370 has a path 1380 and includes two linear portions. As illustrated in FIG. 13, the path 1380 includes a first end 1382 and a second end 1388. The path 1380 extends in a first direction at the first end 1382 of the path 1380 and extends in a second direction substantially parallel to the first direction 1362 at the second end 1388 of the path 1380. The first end 1382 and the second end 1388 of the path 1380 are aligned with a lateral axis 1308.

As shown in FIG. 5B, the joint body 130 of the first plier half 120 may have an exterior surface 136 on one side of the adjustable pliers 100 and an interior surface 138 that faces the second plier half 140. Likewise, the joint body 150 of the second plier half 140 may have an exterior surface 156 on the other side of the adjustable pliers 100 and an interior surface 158 that faces the first plier half 120. In some embodiments, the interior surface 138 of the joint body 130 of the first plier half 120 may be positioned against the interior surface 158 of the joint body 150 of the second plier half 140, such that the interior surface 138 of the joint body 130 of the first plier half 120 slides over the interior surface 158 of the joint body 150 of the second plier half 140 as the adjustable pliers 100 are opened and closed. In other embodiments, the interior surface 138 of the joint body 130 of the first plier half 120 may be spaced from the interior surface 158 of the joint body 150 of the second plier half 140 by a spacer disposed on the stud or otherwise positioned between the interior surface 138 of the joint body 130 of the first plier half 120 and the interior surface 158 of the joint body 150 of the second plier half 140.

In some embodiments, the interior surface 138 of the joint body 130 of the first plier half 120 and the interior surface 158 of the joint body 150 of the second plier half 140 may each be flat, such that the first plier half 120 and the second plier half 140 engage one another on a flat interface. Such a configuration may allow the first plier half 120 and the second plier half 140 to be rotated with respect to one another about the stud 160 without tipping or contacting. Moreover, the stud 160 may be moved from the first end 172 of the slot 170 to the second end 174 of the slot 170 without the need to tip either the first plier half 120 or the second plier half 140 with respect to one another. Beneficially, this allows the user to adjust the pliers 100 without the need for any complicated movements of either plier half.

A performance parameter may be defined, at least in part, by a sixth ratio of a width of the joint body along the lateral axis 108 and a distance between the first end of the path and the second end of the path. The sixth ratio may enable the adjustable pliers to fit inside equipment of a work piece, such as a shaft having a snap-ring. Adjustable pliers having a smaller width of the joint body may be able to fit into smaller spaces more easily. In some embodiments, the performance parameter is defined by at least two of the first ratio, the second ratio, the third ratio, the fourth ratio, the fifth ratio, and the sixth ratio. Further, in some embodiments, the performance parameter is defined by the first ratio, the second ratio, the third ratio, the fourth ratio, the fifth ratio, and the sixth ratio. In some embodiments, the sixth ratio has a value of around 2.08, around 2.16, or around 1.96.

As described herein, the performance parameter may be defined by the first ratio, second ratio, third ratio, fourth ratio, fifth ratio, sixth ratio, or combinations of the ratios. The use of more ratios to define the performance parameter may provide better or more reliable performance of adjustable pliers. For example, use of the first ratio, second ratio, and third ratio provides better or more reliable performance of adjustable pliers than use of only the first ratio and second ratio.

Working tips 132, 152 may each include a respective insertion pin 134, 154, as shown in FIG. 2A. In some embodiments, the working tips 132, 152 could also be needle nose tips, or another configuration.

In some embodiments, handles 122, 142 may each be covered. For example, first handle 122 and/or second handle 142 may be coated with plastic, encased in a rubber sleeve, etc. Further, in some embodiments, handles 122, 142 may each have a width. The width of the first handle 122 and/or second handle 142 may provide comfort to a user. The width of first handle 122 is shown, for example, in FIGS. 5B to 9B.

III. Examples

The examples that follow are illustrative of specific embodiments of the disclosure. They are set forth for explanatory purposes only and should not be construed as limiting the scope of the disclosure. Each of the examples includes a second plier half with a slot for receiving a stud that is coupled to a first plier half, as described above. The slot extends on a path from a first end to a second end, where the first and second ends of the path are aligned with a lateral axis. Moreover, the second plier half extends from a handle to a working tip in a direction that is substantially aligned with a longitudinal axis that is perpendicular to the lateral axis. The examples differ in various dimensions, shapes, and ratios. In particular, the slot in each of examples 1-6 is continuously curved, similar to the embodiments shown in FIGS. 10A to 10C. Further, the slot in each of examples 7-8 is continuously curved, similar to the embodiments shown in FIG. 11. In contrast, the slot in example 9 includes two linear portions, similar to the embodiments shown in FIGS. 12A to 12C. Further, the slot in each of examples 10-12 includes two linear portions, similar to the embodiments shown in FIG. 13. Applicant has determined that with judicious control of selected dimensions and ratios (performance parameters described above), as expressed in the foregoing examples, adjustable pliers can smoothly transition between the first working position and second working position.

Example 1

In a first example, the adjustable pliers have a pliers size of 3845. The working tips have a tip diameter of 38 thousandths of an inch and a tip angle of 45 degrees. A cross section of the working tip of the second plier half, taken along the longitudinal axis, has a length of 0.17.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.057 inches. Accordingly, the ratio of the lateral offset to the bore diameter of the slot is 0.57. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.23 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.35. At the most proximal position of the path, the path extends along a second curved portion having a radius of curvature of 0.35. The resulting ratio of the radius of curvature of the second curved portion and the radius of the bore of the slot is 3.48.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.121 inches. Thus, the ratio of (i) the offset between the first end of the path and the center point of the radius of curvature of the second curved portion to (ii) the distance between the first end of the path and the second end of the path is 0.27. The width of the joint body along the lateral axis is 0.938 inches, such that the ratio of the joint body width to the distance between the first end of the path and the second end of the path is 2.08.

Example 2

In a second example, the adjustable pliers have a pliers size of 3890. The working tips have a tip diameter of 38 thousandths of an inch and a tip angle of 90 degrees. A cross section of the working tip of the second plier half, taken along the longitudinal axis, has a length of 0.12.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.057 inches. Accordingly, the ratio of the lateral offset to the bore diameter of the slot is 0.57. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.23 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.92. At the most proximal position of the path, the path extends along a second curved portion having a radius of curvature of 0.35. The resulting ratio of the radius of curvature of the second curved portion and the radius of the bore of the slot is 3.48.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.121 inches. Thus, the ratio of (i) the offset between the first end of the path and the center point of the radius of curvature of the second curved portion to (ii) the distance between the first end of the path and the second end of the path is 0.27. The width of the joint body along the lateral axis is 0.938 inches, such that the ratio of the joint body width to the distance between the first end of the path and the second end of the path is 2.08.

Example 3

In a third example, the adjustable pliers have a pliers size of 4745. The working tips have a tip diameter of 47 thousandths of an inch and a tip angle of 45 degrees. A cross section of the working tip of the second plier half, taken along the longitudinal axis, has a length of 0.17.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.057 inches. Accordingly, the ratio of the lateral offset to the bore diameter of the slot is 0.57. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.23 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.35. At the most proximal position of the path, the path extends along a second curved portion having a radius of curvature of 0.35. The resulting ratio of the radius of curvature of the second curved portion and the radius of the bore of the slot is 3.48.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.121 inches. Thus, the ratio of (i) the offset between the first end of the path and the center point of the radius of curvature of the second curved portion to (ii) the distance between the first end of the path and the second end of the path is 0.27. The width of the joint body along the lateral axis is 0.938 inches, such that the ratio of the joint body width to the distance between the first end of the path and the second end of the path is 2.08.

Example 4

In a fourth example, the adjustable pliers have a pliers size of 4790. The working tips have a tip diameter of 47 thousandths of an inch and a tip angle of 90 degrees. A cross section of the working tip of the second plier half, taken along the longitudinal axis, has a length of 0.12.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.057 inches. Accordingly, the ratio of the lateral offset to the bore diameter of the slot is 0.57. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.23 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.92. At the most proximal position of the path, the path extends along a second curved portion having a radius of curvature of 0.35. The resulting ratio of the radius of curvature of the second curved portion and the radius of the bore of the slot is 3.48.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.121 inches. Thus, the ratio of (i) the offset between the first end of the path and the center point of the radius of curvature of the second curved portion to (ii) the distance between the first end of the path and the second end of the path is 0.27. The width of the joint body along the lateral axis is 0.938 inches, such that the ratio of the joint body width to the distance between the first end of the path and the second end of the path is 2.08.

Example 5

In a fifth example, the adjustable pliers have a pliers size of 7045. The working tips have a tip diameter of 70 thousandths of an inch and a tip angle of 45 degrees. A cross section of the working tip of the second plier half, taken along the longitudinal axis, has a length of 0.17.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.057 inches. Accordingly, the ratio of the lateral offset to the bore diameter of the slot is 0.57. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.23 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.35. At the most proximal position of the path, the path extends along a second curved portion having a radius of curvature of 0.35. The resulting ratio of the radius of curvature of the second curved portion and the radius of the bore of the slot is 3.48.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.121 inches. Thus, the ratio of (i) the offset between the first end of the path and the center point of the radius of curvature of the second curved portion to (ii) the distance between the first end of the path and the second end of the path is 0.27. The width of the joint body along the lateral axis is 0.973 inches, such that the ratio of the joint body width to the distance between the first end of the path and the second end of the path is 2.16.

Example 6

In a sixth example, the adjustable pliers have a pliers size of 7090. The working tips have a tip diameter of 70 thousandths of an inch and a tip angle of 90 degrees. A cross section of the working tip of the second plier half, taken along the longitudinal axis, has a length of 0.12.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.057 inches. Accordingly, the ratio of the lateral offset to the bore diameter of the slot is 0.57. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.23 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.92. At the most proximal position of the path, the path extends along a second curved portion having a radius of curvature of 0.35. The resulting ratio of the radius of curvature of the second curved portion and the radius of the bore of the slot is 3.48.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.121 inches. Thus, the ratio of (i) the offset between the first end of the path and the center point of the radius of curvature of the second curved portion to (ii) the distance between the first end of the path and the second end of the path is 0.27. The width of the joint body along the lateral axis is 0.973 inches, such that the ratio of the joint body width to the distance between the first end of the path and the second end of the path is 2.16.

Example 7

In a seventh example, the adjustable pliers have a pliers size of 9045. The working tips have a tip diameter of 90 thousandths of an inch and a tip angle of 45 degrees. A cross section of the working tip of the second plier half, taken along the longitudinal axis, has a length of 0.269.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.06 inches. Accordingly, the ratio of the lateral offset to the bore diameter of the slot is 0.6. At the lateral outermost position, the path of the slot extends along a first curved portion having a radius of curvature of 0.22. The resulting ratio of the radius of curvature of the first curved portion and the radius of the slot bore is 2.19.

From the lateral outermost position, the path of the slot extends to a most proximal position that is spaced from the first end of the path, with respect to the longitudinal axis, by a longitudinal offset of 0.43 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.6. At the most proximal position of the path, the path extends along a second curved portion having a radius of curvature of 0.44. The resulting ratio of the radius of curvature of the second curved portion and the radius of the bore of the slot is 4.38.

The distance between the first end of the path and the second end of the path, along the lateral axis, has a length of 0.66. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.22 inches. Thus, the ratio of (i) the offset between the first end of the path and the center point of the radius of curvature of the second curved portion to (ii) the distance between the first end of the path and the second end of the path is 0.33. The width of the joint body along the lateral axis is 1.296 inches, such that the ratio of the joint body width to the distance between the first end of the path and the second end of the path is 1.96.

Example 8

In an eighth example, the adjustable pliers have a pliers size of 9090. The working tips have a tip diameter of 90 thousandths of an inch and a tip angle of 90 degrees. A cross section of the working tip of the second plier half, taken along the longitudinal axis, has a length of 0.19.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.06 inches. Accordingly, the ratio of the lateral offset to the bore diameter of the slot is 0.6. At the lateral outermost position, the path of the slot extends along a first curved portion having a radius of curvature of 0.22. The resulting ratio of the radius of curvature of the first curved portion and the radius of the slot bore is 2.19.

From the lateral outermost position, the path of the slot extends to a most proximal position that is spaced from the first end of the path, with respect to the longitudinal axis, by a longitudinal offset of 0.43 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 2.26. At the most proximal position of the path, the path extends along a second curved portion having a radius of curvature of 0.44. The resulting ratio of the radius of curvature of the second curved portion and the radius of the bore of the slot is 4.38.

The distance between the first end of the path and the second end of the path, along the lateral axis, has a length of 0.66. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.22 inches. Thus, the ratio of (i) the offset between the first end of the path and the center point of the radius of curvature of the second curved portion to (ii) the distance between the first end of the path and the second end of the path is 0.33. The width of the joint body along the lateral axis is 1.296 inches, such that the ratio of the joint body width to the distance between the first end of the path and the second end of the path is 1.96.

Example 9

In a ninth example, the adjustable pliers have a pliers size of 9020. The working tips have a tip diameter of 90 thousandths of an inch and a tip angle of 20 degrees. A cross section of the working tip of the second plier half, taken along the longitudinal axis, has a length of 0.556.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.1 inches. Accordingly, the ratio of the lateral offset to the bore diameter of the slot is 1. At the lateral outermost position, the path of the slot extends along a first curved portion having a radius of curvature of 0.22. The resulting ratio of the radius of curvature of the first curved portion and the radius of the slot bore is 2.19.

From the lateral outermost position, the path of the slot extends to a most proximal position that is spaced from the first end of the path, with respect to the longitudinal axis, by a longitudinal offset of 0.58 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.04. At the most proximal position of the path, the path extends along a second curved portion having a radius of curvature of 0.25. The resulting ratio of the radius of curvature of the second curved portion and the radius of the bore of the slot is 2.49.

The distance between the first end of the path and the second end of the path, along the lateral axis, has a length of 0.66. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.225 inches. Thus, the ratio of (i) the offset between the first end of the path and the center point of the radius of curvature of the second curved portion to (ii) the distance between the first end of the path and the second end of the path is 0.34. The width of the joint body along the lateral axis is 1.296 inches, such that the ratio of the joint body width to the distance between the first end of the path and the second end of the path is 1.96.

Example 10

In a tenth example, the adjustable pliers have a pliers size of 4720. The working tips have a tip diameter of 47 thousandths of an inch and a tip angle of 20 degrees. A cross section of the working tip of the second plier half, taken along the longitudinal axis, has a length of 0.351.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.101 inches. Accordingly, the ratio of the lateral offset to the bore diameter of the slot is 1. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.37 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.05. At the most proximal position of the path, the path extends along a second curved portion having a radius of curvature of 0.14. The resulting ratio of the radius of curvature of the second curved portion and the radius of the bore of the slot is 1.39.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.155 inches. Thus, the ratio of (i) the offset between the first end of the path and the center point of the radius of curvature of the second curved portion to (ii) the distance between the first end of the path and the second end of the path is 0.34. The width of the joint body along the lateral axis is 0.938 inches, such that the ratio of the joint body width to the distance between the first end of the path and the second end of the path is 2.08.

Example 11

In an eleventh example, the adjustable pliers have a pliers size of 7020. The working tips have a tip diameter of 70 thousandths of an inch and a tip angle of 20 degrees. A cross section of the working tip of the second plier half, taken along the longitudinal axis, has a length of 0.351.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.101 inches. Accordingly, the ratio of the lateral offset to the bore diameter of the slot is 1. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.37 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.05. At the most proximal position of the path, the path extends along a second curved portion having a radius of curvature of 0.14. The resulting ratio of the radius of curvature of the second curved portion and the radius of the bore of the slot is 1.39.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.155 inches. Thus, the ratio of (i) the offset between the first end of the path and the center point of the radius of curvature of the second curved portion to (ii) the distance between the first end of the path and the second end of the path is 0.34. The width of the joint body along the lateral axis is 0.973 inches, such that the ratio of the joint body width to the distance between the first end of the path and the second end of the path is 2.16.

Example 12

In a twelfth example, the adjustable pliers have a pliers size of 3820. The working tips have a tip diameter of 38 thousandths of an inch and a tip angle of 20 degrees. A cross section of the working tip of the second plier half, taken along the longitudinal axis, has a length of 0.351.

The slot in the second plier half is formed by a bore having a radius of 0.1005 inches, such that a width of the slot is 0.201 inches. From the first end of the path, the path extends to a lateral outermost position that is spaced from the first end of the path, with respect to the lateral axis, by a lateral offset of 0.101 inches. Accordingly, the ratio of the lateral offset to the bore diameter of the slot is 1. At the lateral outermost position, the path of the slot extends along a first curved portion having a radius of curvature of 0.12. The resulting ratio of the radius of curvature of the first curved portion and the radius of the slot bore is 1.19.

From the lateral outermost position, the path of the slot extends to a most proximal position that is spaced from the first end of the path, with respect to the longitudinal axis, by a longitudinal offset of 0.37 inches. The longitudinal offset allows the working tip of the second plier half to pass the working tip of the first plier half, and is thus greater than the cross-sectional length of the working tip of the second plier half, as described above. Indeed, the ratio the longitudinal offset to the cross-sectional length of the working tip of the second plier half is 1.05. At the most proximal position of the path, the path extends along a second curved portion having a radius of curvature of 0.14. The resulting ratio of the radius of curvature of the second curved portion and the radius of the bore of the slot is 1.39.

The distance between the first end of the path and the second end of the path, along the lateral axis, has a length of 0.45. A center point of the radius of curvature of the second curved portion is positioned, with respect to the lateral axis, between the first end of the path and the second end of the path. An offset, along the lateral axis, between the first end of the path and the center point of the radius of curvature of the second curved portion has a length of 0.155 inches. Thus, the ratio of (i) the offset between the first end of the path and the center point of the radius of curvature of the second curved portion to (ii) the distance between the first end of the path and the second end of the path is 0.34. The width of the joint body along the lateral axis is 0.938 inches, such that the ratio of the joint body width to the distance between the first end of the path and the second end of the path is 2.08.

IV. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a symptom.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. Adjustable pliers comprising:

a first plier half including a first handle and a first working tip opposite the first handle;

a second plier half coupled to the first plier half, the second plier half including a second handle, a second working tip opposite the second handle, and a slot extending along a path from a first end of the path to a second end of the path, the path extending in a first direction at the first end of the path and extending in a second direction substantially parallel to the first direction at the second end of the path, wherein the first end of the path and the second end of the path are aligned with a first axis, and wherein the second plier half extends from the second handle to the second working tip in a direction that is substantially aligned with a second axis that is perpendicular to the first axis, and wherein a performance parameter is defined, at least in part, by a relationship between dimensions of the slot and of the first working tip; and a stud disposed in the slot, the stud being configured to be fixed with respect to the first plier half, wherein when the stud is disposed at the first end of the slot and as the first and second handles are pushed toward each other, the first and second working tips are configured to move away from each other, and wherein when the stud is disposed at the second end of the slot and as the first and second handles are pushed toward each other, the first and second working tips are configured to move toward each other, wherein the path of the slot extends:

(i) from the first end of the path to a lateral outermost position, the lateral outermost position being spaced from the first end of the path with respect to the first axis by a lateral offset, (ii) from the lateral outermost position to a most proximal position, the most proximal position being spaced from the first end of the path with respect to the second axis by a longitudinal offset, and (iii) from the most proximal position to the second end of the path, wherein the lateral outermost position is disposed on a first curved portion of the path, wherein the most proximal position is disposed on a second curved portion of the path, and wherein the performance parameter is defined, at least in part, by a second ratio of (i) the longitudinal offset and (ii) a cross-sectional length of the second working tip along the second axis.

2. The adjustable pliers of claim 1, wherein the performance parameter is defined, at least in part, by a first ratio of (i) the lateral offset and (ii) one half of a width of the first end of the slot.

3. The adjustable pliers of claim 2, wherein the first ratio has a value in a range of 0.55 to 1.10.

4. The adjustable pliers of claim 1, wherein the second ratio has a value in a range of 1.03 to 2.28.

5. The adjustable pliers of claim 1, wherein the performance parameter is defined, at least in part, by a third ratio of (i) an offset between the first end of the path and a center point of a radius of curvature of the second curved portion and (ii) a distance between the first end of the path and the second end of the path.

6. The adjustable pliers of claim 5, wherein the third ratio has a value in a range of 0.26 to 0.35.

7. The adjustable pliers of claim 1, wherein the performance parameter is defined by the second ratio and at least one of:

a first ratio of (i) the lateral offset and (ii) one half of a width of the first end of the slot, and a third ratio of (i) an offset between the first end of the path and a center point of a radius of curvature of the second curved portion and (ii) a distance between the first end of the path and the second end of the path.

8. The adjustable pliers of claim 1, wherein the performance parameter is defined, at least in part, by a fourth ratio of a radius of curvature of the first curved portion and one half of the width of the first end of the slot.

9. The adjustable pliers of claim 8, wherein the fourth ratio has a value of 1.19 or 2.19.

10. The adjustable pliers of claim 1, wherein the path of the slot is continuously curved.

11. The adjustable pliers of claim 10, wherein the second curved portion extends to the second end of the path.

12. The adjustable pliers of claim 10, wherein the performance parameter is defined, at least in part, by a first ratio of (i) the lateral offset and (ii) one half of a width of the first end of the slot, and wherein the first ratio has a value of 0.57 or 0.60.

13. The adjustable pliers of claim 1, wherein the second ratio has a value of 1.35, 1.92, 1.60, or 2.26.

14. The adjustable pliers of claim 1, wherein the performance parameter is defined, at least in part, by a third ratio of (i) an offset between the first end of the path and a center point of a radius of curvature of the second curved portion and (ii) a distance between the first end of the path and the second end of the path, and wherein the third ratio has a value of 0.27 or 0.33.

15. The adjustable pliers of claim 1, wherein the performance parameter is defined, at least in part, by a fifth ratio of a radius of curvature of the second curved portion and one half of the width of the first end of the slot.

16. The adjustable pliers of claim 15, wherein the fifth ratio has a value of 3.48 or 4.38.

17. Adjustable pliers comprising:

a first plier half including a first handle and a first working tip opposite the first handle;

a second plier half coupled to the first plier half, the second plier half including a second handle, a second working tip opposite the second handle, and a slot extending along a path from a first end of the path to a second end of the path, the path extending in a first direction at the first end of the path and extending in a second direction substantially parallel to the first direction at the second end of the path, wherein the first end of the path and the second end of the path are aligned with a first axis, and wherein the second plier half extends from the second handle to the second working tip in a direction that is substantially aligned with a second axis that is perpendicular to the first axis, and wherein a performance parameter is defined, at least in part, by a relationship between dimensions of the slot; and a stud disposed in the slot, the stud being configured to be fixed with respect to the first plier half, wherein when the stud is disposed at the first end of the slot and as the first and second handles are pushed toward each other, the first and second working tips are configured to move away from each other, and wherein when the stud is disposed at the second end of the slot and as the first and second handles are pushed toward each other, the first and second working tips are configured to move toward each other, wherein the path of the slot extends:

(i) from the first end of the path to a lateral outermost position, the lateral outermost position being spaced from the first end of the path with respect to the first axis by a lateral offset, (ii) from the lateral outermost position to a most proximal position, the most proximal position being spaced from the first end of the path with respect to the second axis by a longitudinal offset, and (iii) from the most proximal position to the second end of the path, wherein the lateral outermost position is disposed on a first curved portion of the path, wherein the most proximal position is disposed on a second curved portion of the path, and wherein the path of the slot includes a first linear portion between the first curved portion and the second curved portion, and a second linear portion between the second curved portion and the second end of the path.

18. The adjustable pliers of claim 17, wherein the performance parameter is defined, at least in part, by a first ratio of (i) the lateral offset and (ii) one half of a width of the first end of the slot, and wherein the first ratio has a value of 1.

* * * * *